(12) United States Patent
Chu et al.

(10) Patent No.: US 11,372,073 B2
(45) Date of Patent: *Jun. 28, 2022

(54) ERROR RECOVERY IN NULL DATA PACKET (NDP) RANGING

(71) Applicant: NXP USA, INC., Austin, TX (US)

(72) Inventors: Liwen Chu, San Ramon, CA (US); Hongyuan Zhang, Fremont, CA (US); Hui-ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/910,944

(22) Filed: Jun. 24, 2020

(65) Prior Publication Data

US 2020/0319287 A1    Oct. 8, 2020

Related U.S. Application Data

(63) Continuation of application No. 16/179,477, filed on Nov. 2, 2018, now Pat. No. 10,712,422.

(60) Provisional application No. 62/723,946, filed on Aug. 28, 2018, provisional application No. 62/623,419, filed on Jan. 29, 2018.

(51) Int. Cl.
| | |
|---|---|
| *G01S 3/46* | (2006.01) |
| *G01S 5/00* | (2006.01) |
| *G01S 5/14* | (2006.01) |
| *G01S 5/12* | (2006.01) |
| *H04L 1/00* | (2006.01) |
| *H04L 69/22* | (2022.01) |
| *H04L 69/323* | (2022.01) |

(52) U.S. Cl.
CPC .............. *G01S 3/46* (2013.01); *G01S 5/0036* (2013.01); *G01S 5/12* (2013.01); *G01S 5/14* (2013.01); *H04L 1/0011* (2013.01); *H04L 69/22* (2013.01); *H04L 69/323* (2013.01)

(58) Field of Classification Search
CPC .............. G01S 3/46; G01S 5/0036; G01S 5/14
See application file for complete search history.

(56) References Cited

U.S. PATENT DOCUMENTS

| | | | |
|---|---|---|---|
| 2017/0261591 A1* | 9/2017 | Zhang ........................ G01S 5/14 |
| 2018/0027561 A1* | 1/2018 | Segev ................... H04L 5/0069 370/329 |
| 2018/0041990 A1* | 2/2018 | Venkatesan .......... H04B 7/0619 |

* cited by examiner

*Primary Examiner* — Joseph D Torres

(57) ABSTRACT

A first communication device transmits a first physical layer protocol data units (PPDU) that includes a first null data packet announcement (NDPA) frame as part of a first ranging measurement exchange. The first communication device transmits a first null data packet (NDP) as part of the first ranging measurement exchange, and records a transmit time of the first NDP. The first communication device determines whether a second NDP was received correctly from a second communication device as part of the first ranging measurement exchange. In response to determining that the second NDP was not received correctly, the first communication device commences a second ranging measurement exchange, including transmitting a second PPDU that includes a second NDPA frame as part of the second ranging measurement exchange.

20 Claims, 12 Drawing Sheets

ERROR RECOVERY IN NULL DATA PACKET (NDP) RANGING

This application is a continuation application of U.S. patent application entitled "Error Recovery in Null Data packet (NDP) Ranging", having a Ser. No. 16/179,477, having a filing date of Nov. 2, 2018; which claims the benefit of the U.S. provisional application entitled "CLEAR CHANNEL ASSESSMENT (CCA) AND ERROR RECOVERY OF NULL DATA PACKET (NDP) RANGING", having a Ser. No. 62/723,946, and having a filling date of Aug. 28, 2018; which claims the benefit of the U.S. provisional application entitled "CLEAR CHANNEL ASSESSMENT (CCA) AND ERROR RECOVERY OF NULL DATA PACKET (NDP) RANGING", having a Ser. No. 62/623,419, and having a filling date of Jan. 29, 2018, having common inventors, and having a common assignee, all of which is incorporated by reference in its entirety.

CROSS REFERENCES TO RELATED APPLICATIONS

This application claims the benefit of U.S. Provisional Patent Application No. 62/623,419, entitled "Clear Channel Assessment (CCA) and Error Recovery of Null Data Packet (NDP) Ranging." filed on Jan. 29, 2018, and U.S. Provisional Patent Application No. 62/723,946, entitled "Clear Channel Assessment (CCA) and Error Recovery of Null Data Packet (NDP) Ranging," filed on Aug. 28, 2018. The applications listed above are expressly incorporated herein by reference in their entireties.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the distance is determined based on the measured time of flight. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method includes: transmitting, by a first communication device, a first physical layer protocol data units (PPDU) that includes a first null data packet announcement (NDPA) frame as part of a first ranging measurement exchange, wherein the first ranging measurement exchange is among a set of ranging measurement exchanges; transmitting, by the first communication device, a first null data packet (NDP) as part of the first ranging measurement exchange; recording, by the first communication device, a transmit time of the first NDP; determining, by the first communication device, whether a second NDP was received correctly from a second communication device as part of the first ranging measurement exchange; and in response to determining that the second NDP was not received correctly, commencing, by the first communication device, a second ranging measurement exchange, including transmitting a second PPDU that includes a second NDPA frame as part of the second ranging measurement exchange, wherein the second ranging measurement exchange is among the set of ranging measurement exchanges.

In another embodiment, an apparatus comprises: a network interface device associated with a first communication device, wherein the network interface device comprises one or more integrated circuit (IC) devices. The one or more IC devices are configured to: transmit a first physical layer protocol data units (PPDU) that includes a first null data packet announcement (NDPA) frame as part of a first ranging measurement exchange, wherein the first ranging measurement exchange is among a set of ranging measurement exchanges; transmit a first null data packet (NDP) as part of the first ranging measurement exchange; record a transmit time of the first NDP; determine whether a second NDP was received correctly from a second communication device as part of the first ranging measurement exchange; and in response to determining that the second NDP was not received correctly, commence a second ranging measurement exchange, including transmitting a second PPDU that includes a second NDPA frame as part of the second ranging measurement exchange, wherein the second ranging measurement exchange is among the set of ranging measurement exchanges.

DETAILED DESCRIPTION

Ranging measurement procedures and techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement procedures and techniques are utilized in other types of wireless communication systems such as personal area networks (PANs), mobile communication networks such as cellular networks, metropolitan area networks (MANs), etc.

Figure 1:
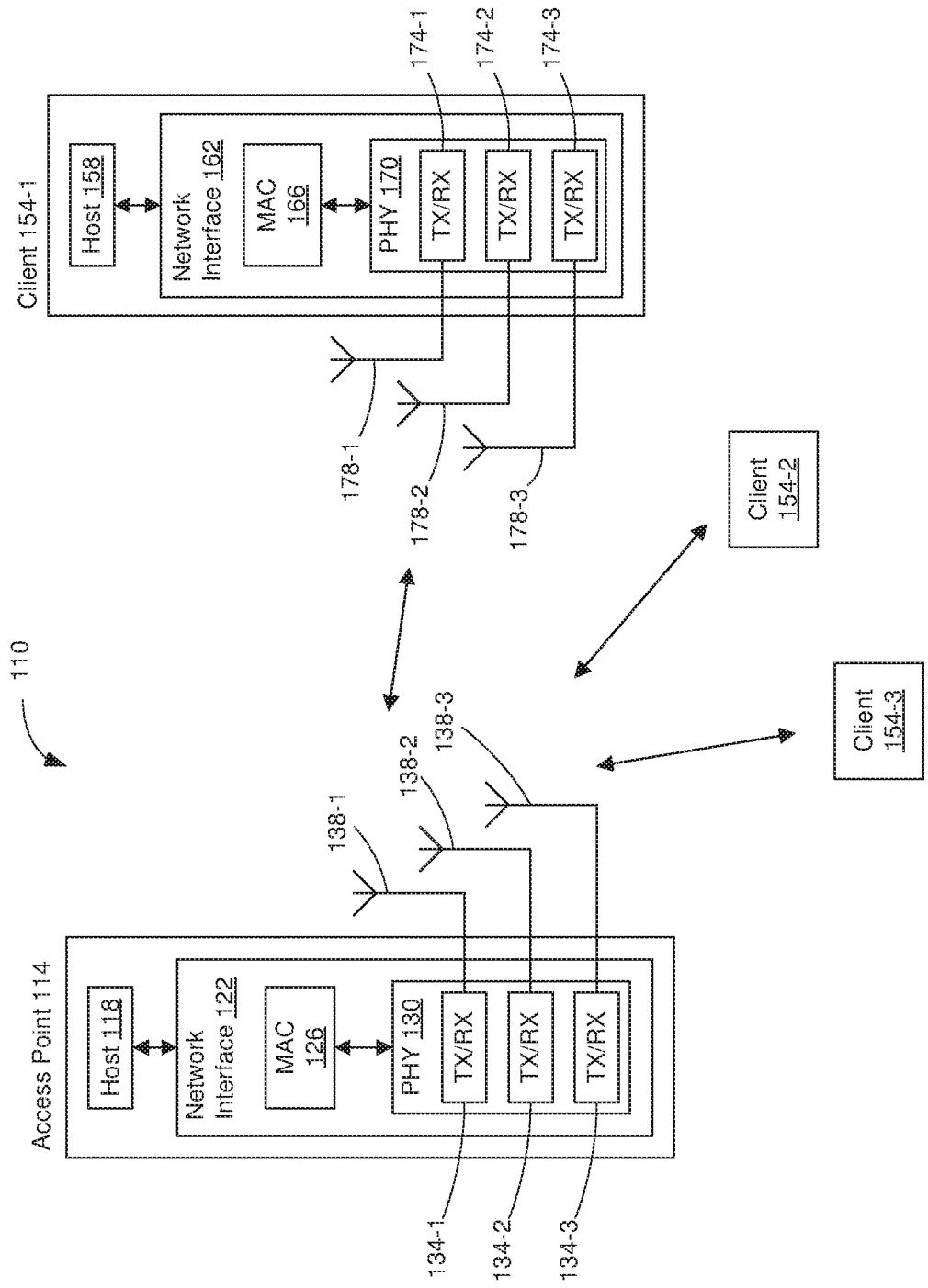
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
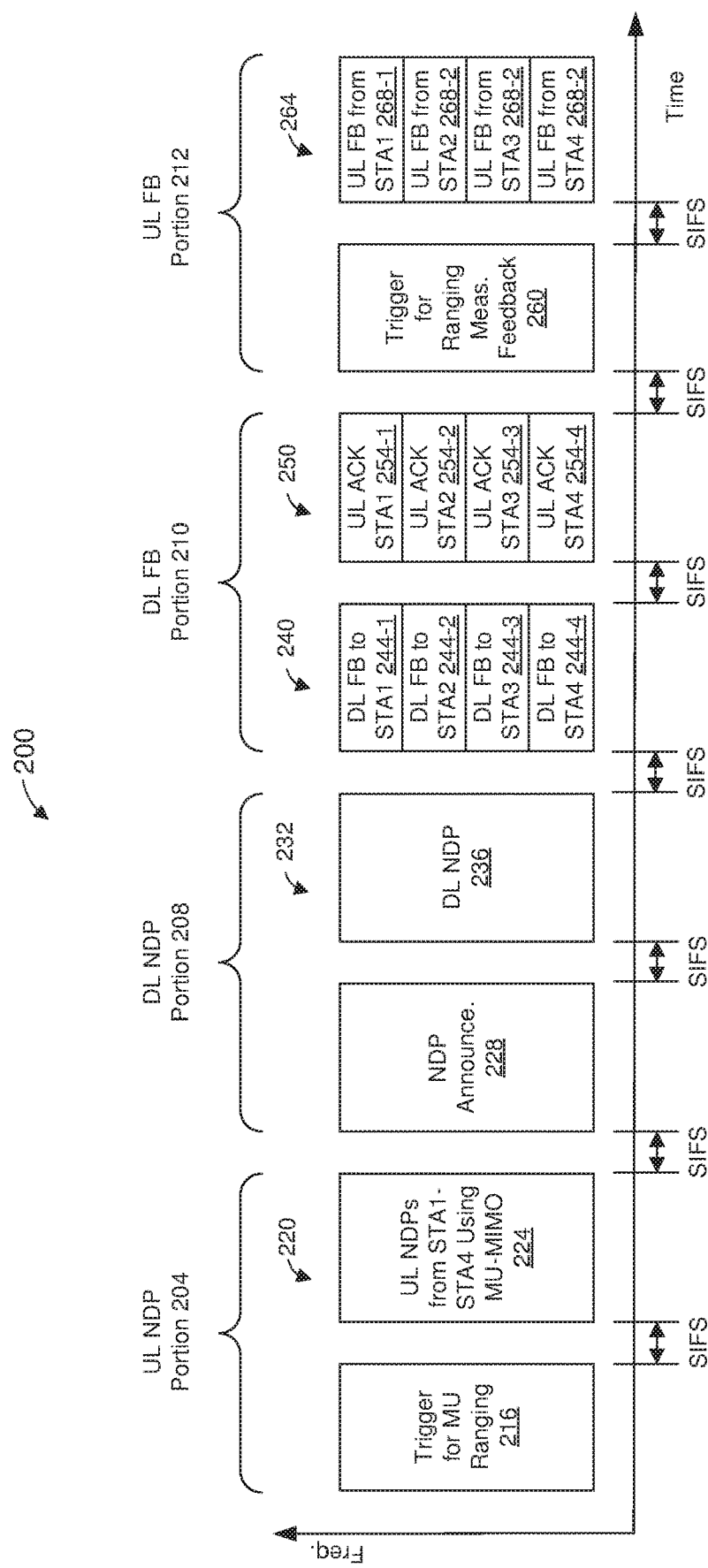
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) portion 204, a downlink (DL) NDP portion 208, a DL feedback (FB) portion 210, and an UL FB portion 212. In an embodiment, the uplink UL NDP portion 204, the DL NDP portion 208, the DL FB portion 210, and the UL FB portion 212 occur within a single transmit opportunity period (TXOP). In another embodiment, the uplink UL NDP portion 204, the DL NDP portion 208, the DL FB portion 210, and the UL FB portion 212 do not occur within a single TXOP. For example, the uplink UL NDP portion 204 and the DL NDP portion 208 occur within a single TXOP, whereas the DL FB portion 210 and the UL FB portion 212 occur after the single TXOP (e.g., in another TXOP or in multiple other TXOPs).

In the UL NDP portion 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. In an embodiment, each PHY preamble of each UL NDP 224 includes i) a legacy portion having a legacy STF (L-STF), a legacy LTF (L-LTF), and a legacy signal field (L-SIG), and ii) a non-legacy portion having one or more non-legacy training fields (e.g., a non-legacy LTF (NL-LTF)) and one or more non-legacy signal fields (NL-SIGs). The UL NDPs 224 omit PHY data portions.

When transmitting the UL NDPs 224, each client station 154 records a time $t_{1,k}$ at which the client station 154 began transmitting a particular portion of the UL NDP 224 (e.g., a first occurring NL-LTF in the UL NDP 224), where k is an index indicating the particular client station 154. A time such as $t_{1,k}$ is sometimes referred to herein as a "transmit time" or a "time of departure" (ToD)." Similarly, when the AP 114 receives each UL NDP 224, the AP 114 records a time $t_{2,k}$ at which the AP 114 began receiving the particular portion of the UL NDP 224 (e.g., the first occurring NL-LTF in the UL NDP 224). A time such as $t_{2,k}$ is sometimes referred to herein as a "receive time" or a "time of arrival" (ToD)."

In some embodiments, when transmitting the UL NDPs 224, each of at least some of the client stations 154 (e.g., client stations 154 with multiple antennas 174) records an angle of departure. $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
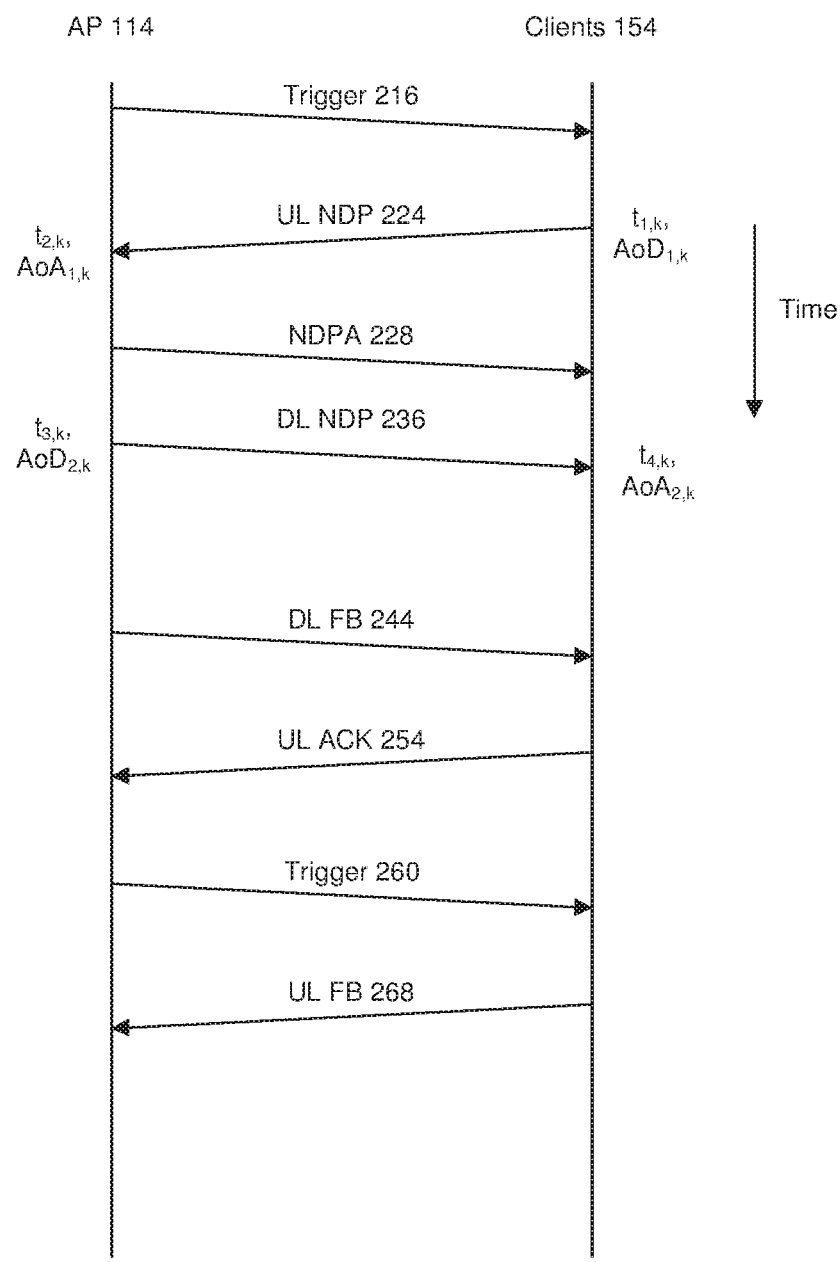
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the particular portion of the UL NDP 224 (e.g., the first occurring NL-LTF in the UL NDP 224), and records the $AoD_{1,k}$ at which the UL NDP 224 left the antennas 178 of the client station 154. Additionally, the AP 114 records the time $t_{2,k}$ at which the AP 114 began receiving the particular portion (e.g., a first occurring NL-LTF) in each UL NDP 224, and the $AoA_{1,k}$, at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address or a multicast destination address) to the client stations 154. The DL NDP(s) 236 include PHY preamble(s) having one or more STFs, one or more LTFs and one or more signal fields, in an embodiment. In an embodiment, the PHY preamble of the DL NDP 236 includes i) a legacy portion having an L-STF, an L-LTF, and an L-SIG, and ii) a non-legacy portion having one or more NL-LTFs, and one or more NL-SIGs. The DL NDP(s) 236 omit PHY data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast or multicast to the client stations 154.

When transmitting the DL NDP(s) 236, the AP 114 records a time $t_{3,k}$ at which the AP 114 began transmitting a particular portion of the DL NDP(s) 236 (e.g., a first occurring NL-LTF in each DL NDP(s) 236). Similarly, when each client station 154 receives the corresponding DL NDP 236, the client station 154 records a time $t_{4,k}$ at which the client station 154 began receiving the particular portion of the DL NDP 236 (e.g., the first occurring NL-LTF in the DL NDP 236). As illustrated in FIG. 2B, the AP 114 records the time $t_{3,k}$ at which the AP 114 began transmitting the particular portion of the DL NDP 236 (e.g., the first occurring NL-LTF in the DL NDP 236), and the client station 154 records the time $t_{4,k}$ at which the client station 154 began receiving the particular portion of the DL NDP 236 (e.g., the first occurring NL-LTF in the DL NDP 236).

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station

154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB portion 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes (optionally) the recorded angles $AoA_{1,k}$ and $AoD_{2,k}$. In some embodiments, the FB frames 244 optionally also include respective channel estimate information determined by the AP 114 based on reception of the UL NDPs 224.

In another embodiment, the FB frames 244 respectively include recorded times $t_{2,k}$ and $t_{3,k}$, corresponding to a previous MU ranging measurement exchange (similar to the MU ranging measurement exchange 200) that occurred prior to the MU ranging measurement exchange 200. In some embodiments, each of one or more FB frames 244 respectively includes (optionally) the recorded angles $AoA_{1,k}$ and $AoD_{2,k}$ corresponding to the previous MU ranging measurement exchange that occurred prior to the MU ranging measurement exchange 200. In some embodiments, the FB frames 244 optionally also include respective channel estimate information determined by the AP 114 based on reception of UL NDPs corresponding to the previous MU ranging measurement exchange that occurred prior to the MU ranging measurement exchange 200.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In another embodiment, in which the FB frames 244 respectively include recorded times $t_{2,k}$ and $t_{3,k}$ corresponding to the previous MU ranging measurement exchange that occurred prior to the MU ranging measurement exchange 200, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$ that correspond to the previous MU ranging measurement exchange, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not generate and transmit the UL MU transmission 250 (e.g., the client stations 154 do not generate and transmit the AC frames 254).

In an embodiment in which client stations 154 are to transmit the UL ACKs 254 in response to correctly receiving the DL FB frames 244, and when the AP 114 does not receive a UL ACK(s) 254 from one or more of the client stations 154, the AP 114 retransmits one or more of the FB frames 244 to the client station(s) 154 that did not transmit the UL ACK(s) 254. In an embodiment, the retransmission the FB frames 244 is included in a DL PPDU (not shown) that is transmitted after a time period by which the AP 114 expected to receive the UL ACK 254.

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes (optionally) the recorded angles $AoD_{1,k}$ and $AoA_{2,k}$. In some embodiments, the PPDUs 268 optionally also include respective channel estimate information determined by the client station 154 based on reception of the DL NDP 236.

In another embodiment in which a previous MU ranging measurement exchange (similar to the MU ranging measurement exchange 200) occurred prior to the MU ranging measurement exchange 200, the UL PPDUs 268 respectively include recorded times $t_{1,k}$ and $t_{4,k}$, corresponding to the previous MU ranging measurement exchange. In some embodiments, each of one or more FB frames 244 respectively includes (optionally) the recorded angles $AoD_{1,k}$ and $AoA_{2,k}$ corresponding to the previous MU ranging measurement exchange that occurred prior to the MU ranging measurement exchange 200. In some embodiments, the UL PPDUs 268 optionally also include respective channel estimate information determined by the AP 114 based on reception of UL NDPs corresponding to the previous MU ranging measurement exchange that occurred prior to the MU ranging measurement exchange 200.

After receipt of the UL PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In another embodiment in which the UL PPDUs 268 respectively include recorded times $t_{1,k}$ and $t_{4,k}$ corresponding to the previous MU ranging measurement exchange that occurred prior to the MU ranging measurement exchange 200, the AP 114 calculates one or more respective of times-of-flight between the AP 114 and the one or more client stations 154 using the recorded times $t_{1,k}$, $t_{2,k}$, $t_{3,k}$, and $t_{4,k}$ that correspond to the previous MU ranging measurement exchange, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In an embodiment, responsive to receipt of the FB frames 268, the AP 114 generates a DL transmission (not shown in FIG. 1) that includes ACK information that indicates the AP 114 correctly received the FB frames 268. The AP 114 transmits the DL transmission (not shown in FIG. 1) that includes the ACK information a defined time period after an end of the UL transmission 264. In an embodiment, the defined time period is SIFS. In other embodiments, another suitable time period is utilized. In some embodiments, the AP 114 does not generate and transmit a DL transmission that includes ACK information that indicates the AP 114 correctly received the FB frames 268.

In another embodiment, the order, in time, of the DL FB portion 210 and the UL FB portion 212 is reversed, and the UL FB portion 212 occurs before the DL FB portion 210. In some embodiments, the DL FB portion 210 is omitted. In some embodiments, the UL FB portion 212 is omitted.

Figure 3A:
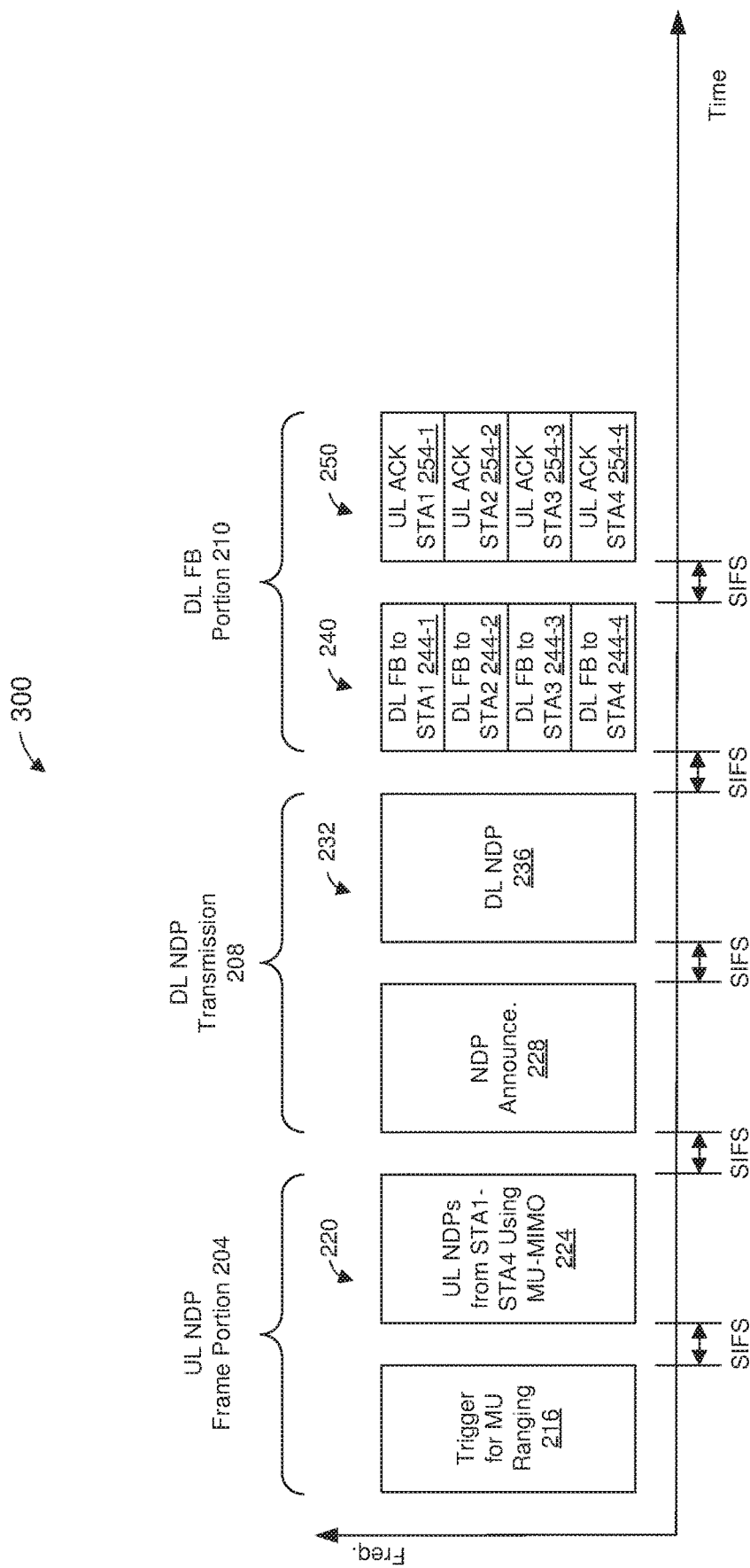
FIG. 3A is a diagram of another example MU ranging measurement exchange in an MU ranging measurement procedure, according to another embodiment.

FIG. 3A is a diagram of another example MU ranging measurement exchange 300 in an MU ranging measurement procedure, according to an embodiment. The MU ranging measurement exchange 300 is similar to the MU ranging measurement exchange 200 of FIG. 2A, but omits the UL FB portion 212. In an embodiment, the UL transmission 250 is omitted.

Figure 3B:
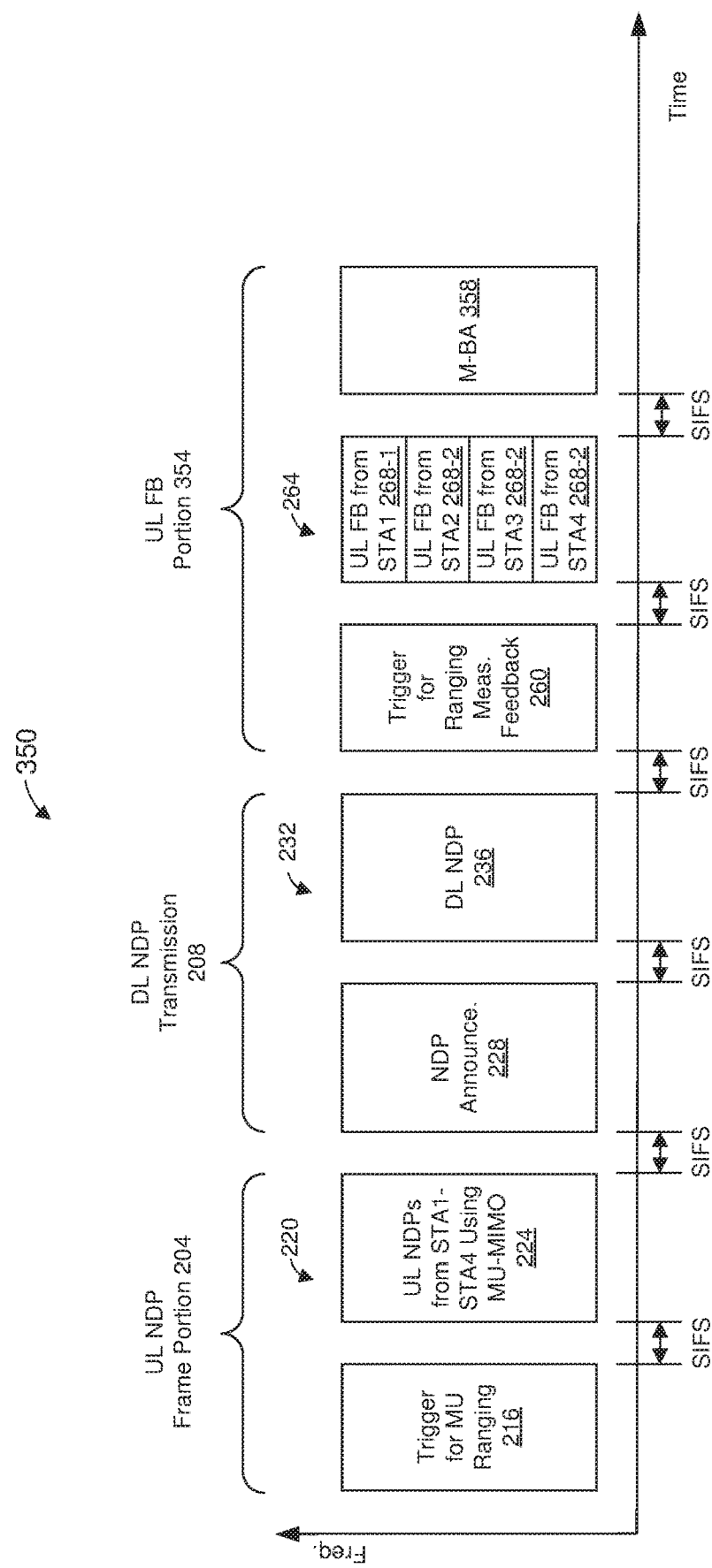
FIG. 3B is a diagram of another example MU ranging measurement exchange in an MU ranging measurement procedure, according to another embodiment.

FIG. 3B is a diagram of another example MU ranging measurement exchange 350 in an MU ranging measurement procedure, according to an embodiment. The MU ranging measurement exchange 350 is similar to the MU ranging measurement exchange 200 of FIG. 2A, but omits the DL FB portion 210. Additionally, an UL FB portion 354 includes a DL transmission 358 corresponding to a multi-station block acknowledgment (M-BA) to acknowledge the UL FB frames 268. In an embodiment, the DL transmission 358 is omitted.

Referring now to FIGS. 2A, 3A, and 3B, in an embodiment, the trigger frame 216 includes a sub-field that indicates whether the client stations 154 that are to transmit the UL NDPs 224 are to perform a clear channel assessment (CCA) operation prior to transmitting as part of the UL transmission 220. In an embodiment, the sub-field is a single bit that indicates whether the client stations 154 that are to transmit the UL NDPs 224 are to perform the CCA operation prior to transmitting as part of the UL transmission 220. In an embodiment, the CCA operation includes a physical CCA, which involves measuring an energy level in a communication channel and comparing the energy level to a threshold. In an embodiment, the energy level being below the threshold indicates that the communication channel is idle; whereas the energy level meeting the threshold indicates that the communication channel is busy.

In an embodiment, the CCA operation also includes a virtual CCA, which involves monitoring a timer that indicates whether another communication device is using the communication channel. For example, when the client station 154 receives a packet, the client station 154 examines a value of a duration field in a MAC header of the packet and sets a network allocation vector (NAV) timer according to the value of the duration field. The NAV timer then counts down at a predetermined rate. When the NAV counter reaches zero, this indicates that the communication channel is idle, according to an embodiment. In an embodiment, the virtual CCA includes examining a NAV timer—the NAV timer being zero indicates that the communication channel is idle; whereas the NAV timer being non-zero indicates that the communication channel is busy. In an embodiment, when setting the NAV timer in response to receiving a packet, the client station 154 records a network address (e.g., a MAC address, an association identifier (AID), etc.) of the communication device that transmitted the packet to associate the NAV timer with the communication device that transmitted the packet. In some situations, the client station 154 concludes the virtual CCA indicates the channel is idle even when the NAV timer is non-zero for a particular value of the network address associated with the setting of the NAV timer, according to some embodiments.

Figure 4:
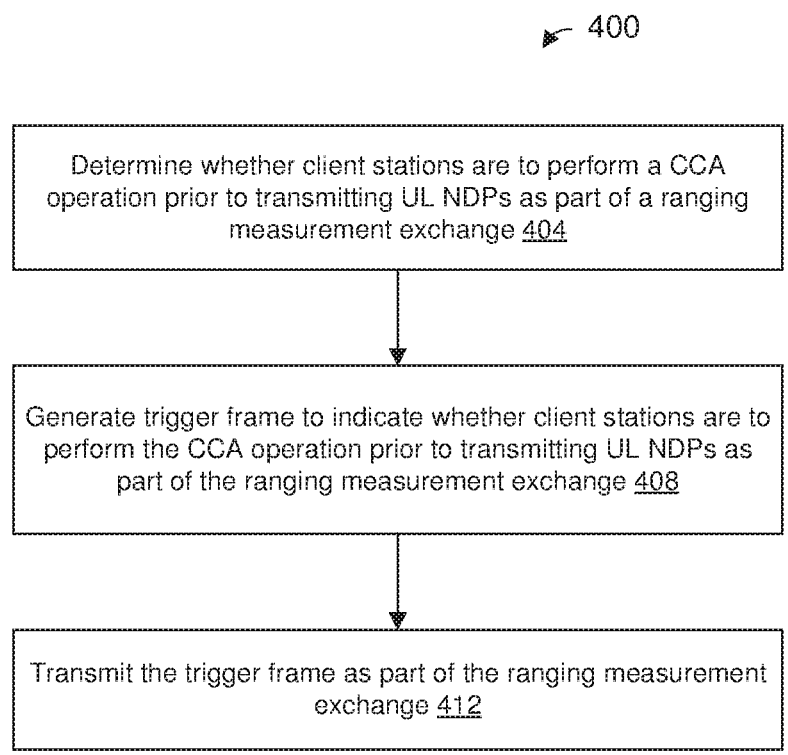
FIG. 4 is a flow diagram of an example method for performing a ranging measurement procedure, according to an embodiment.

FIG. 4 is a flow diagram of an example method 400 for performing a ranging measurement procedure, according to an embodiment. In some embodiments, the network interface device 122 of FIG. 1 is configured to implement the method 400. The method 400 is described in the context of the network interface device 122 merely for explanatory purposes and, in other embodiments, the method 400 is implemented by another suitable device. For instance, in an embodiment, the network interface device 162 of FIG. 1, or another suitable WLAN network interface device is configured to implement the method 400.

At block 404, the network interface device 122 determines whether client stations are to perform a CCA operation prior to transmitting UL NDPs (e.g., UL NDPs 224) as part of a ranging measurement exchange (e.g., the ranging measurement exchange 200, the ranging measurement exchange 300, the ranging measurement exchange 350, etc.). In an embodiment, determining whether client stations are to perform a CCA operation prior to transmitting UL NDPs as part of a ranging measurement exchange is based on determining a level of use of a communication channel. For example, determining whether client stations are to perform a CCA operation prior to transmitting UL NDPs as part of a ranging measurement exchange is based on determining how many communication devices are in a communication network (BSS) in which the network interface device 122 is operating, according to an embodiment. For instance, if a number of communication devices in the communication network meets a threshold, the network interface device 122 determines that client stations are to perform a CCA operation prior to transmitting UL NDPs as part of a ranging measurement exchange, whereas if the number of communication devices in the communication network is below the threshold, the network interface device 122 determines that client stations are not to perform the CCA operation prior to transmitting UL NDPs as part of a ranging measurement exchange, according to an embodiment.

As another example, determining whether client stations are to perform a CCA operation prior to transmitting UL NDPs as part of a ranging measurement exchange is based on determining how many other communication networks (sometimes referred to as "neighboring networks" or "neighboring BSSs") are proximate a communication network (BSS) in which the network interface device 122 is operating, according to an embodiment. For instance, if a number of neighboring networks meets a threshold, the network interface device 122 determines that client stations are to perform a CCA operation prior to transmitting UL NDPs as part of a ranging measurement exchange, whereas if the number of neighboring networks is below the threshold, the network interface device 122 determines that client stations are not to perform the CCA operation prior to transmitting UL NDPs as part of a ranging measurement exchange, according to an embodiment.

At block 408, the network interface device 122 generates a trigger frame to prompt a group of client stations 154 to transmit UL NDPs (e.g., UL NDPs 224) as part of a ranging measurement exchange (e.g., the ranging measurement exchange 200, the ranging measurement exchange 300, the ranging measurement exchange 350, etc.). In an embodiment, the network interface device 122 generates the trigger frame to indicate whether client stations are to perform a CCA operation prior to transmitting the UL NDPs (e.g., UL NDPs 224) as part of the ranging measurement exchange. In an embodiment, the network interface device 122 generates the trigger frame to include a sub-field that indicates whether client stations are to perform a CCA operation prior to transmitting the UL NDPs (e.g., UL NDPs 224) as part of the ranging measurement exchange. In an embodiment, the network interface device 122 generates the trigger frame to indicate whether client stations are to perform a CCA operation prior to transmitting the UL NDPs (e.g., UL NDPs 224) as part of the ranging measurement exchange in accordance with the determination made at block 404.

At block 412, the network interface device 122 transmits the trigger frame to prompt the group of client stations 154 to transmit UL NDPs (e.g., UL NDPs 224) as part of the ranging measurement exchange (e.g., the ranging measurement exchange 200, the ranging measurement exchange 300, the ranging measurement exchange 350, etc.).

Figure 5:
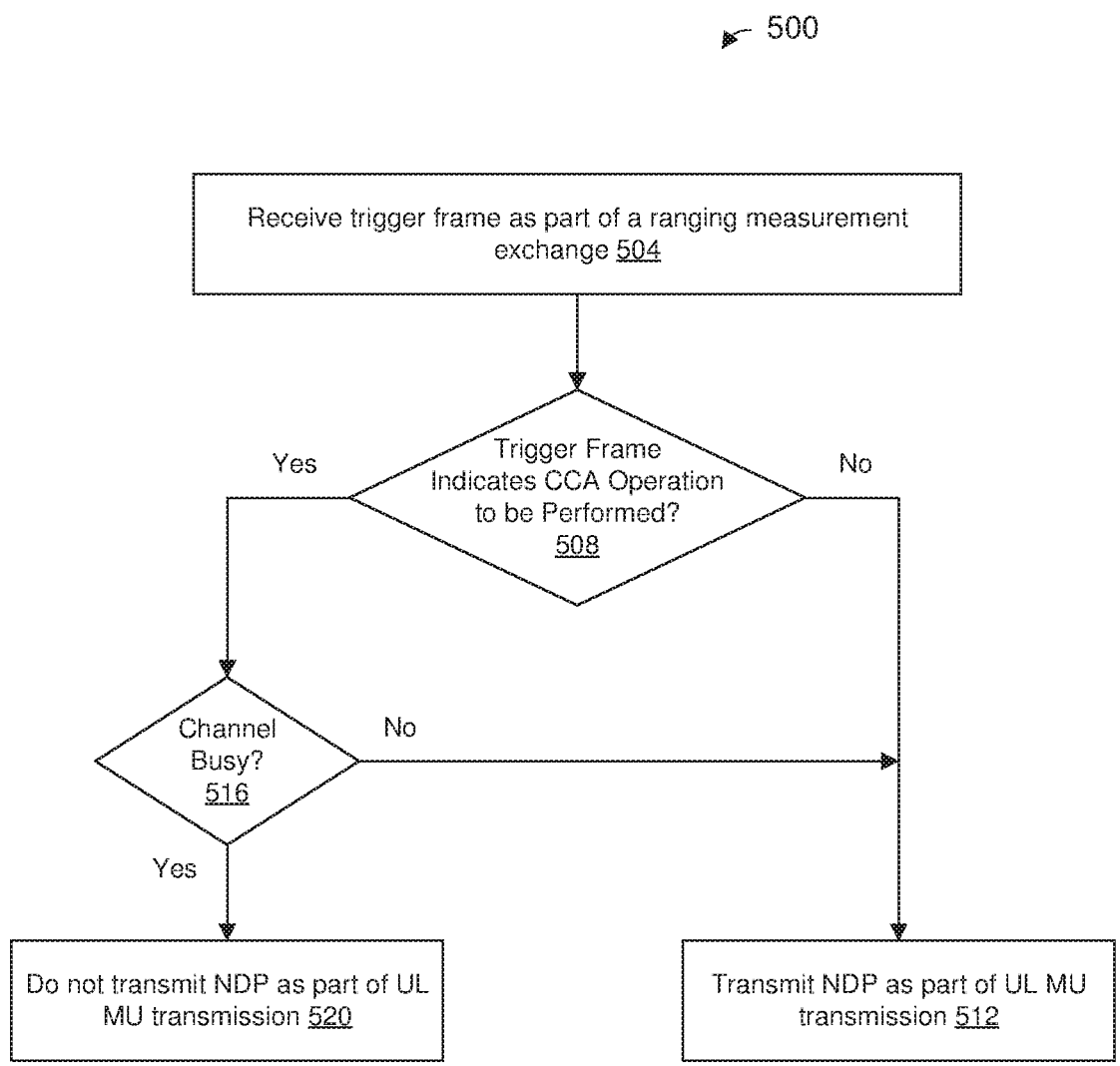
FIG. 5 is a flow diagram of another example method for performing a ranging measurement procedure, according to an embodiment.

FIG. 5 is a flow diagram of an example method 500 for performing a ranging measurement procedure, according to an embodiment. In some embodiments, the network interface device 162 of FIG. 1 is configured to implement the method 500. The method 400 is described in the context of the network interface device 162 merely for explanatory purposes and, in other embodiments, the method 500 is implemented by another suitable device. For instance, in an embodiment, the network interface device 122 of FIG. 1, or another suitable WLAN network interface device is configured to implement the method 500.

At block 504, the network interface device 162 receives a trigger frame (e.g., the trigger frame 216) as part of a ranging measurement exchange (e.g., the ranging measurement exchange 200, the ranging measurement exchange 300, the ranging measurement exchange 350, etc.). In an embodiment, the trigger frame is configured to prompt a plurality of communication devices to transmit NDPs as part of an UL MU transmission (the UL MU transmission 220) as part of the ranging measurement exchange.

At block 508, the network interface device 162 determines whether the trigger frame (received at block 504) indicates that the network interface device 162 is to perform a CCA procedure prior to transmitting an NDP in response to the trigger frame. In an embodiment, block 508 includes analyzing a sub-field in the trigger frame to determine whether the sub-field indicates that the network interface device 162 is to perform a CCA procedure prior to transmitting an NDP in response to the trigger frame.

In response to determining, at block 508, that the trigger frame (received at block 504) does not indicate that the network interface device 162 is to perform a CCA procedure prior to transmitting an NDP in response to the trigger frame, the flow proceeds to block 512. At block 512, the network interface device 162 transmits an NDP in response to the trigger frame received at block 504. In an embodiment, block 512 includes transmitting the NDP a defined time period (e.g., SIFS) after an end of reception of a PPDU that includes the trigger frame (received at block 504). In an embodiment and when block 512 is performed in response to determining, at block 508, that the trigger frame does not indicate that the network interface device 162 is to perform a CCA procedure, block 512 is performed without first performing the CCA operation in connection with transmitting the NDP. In an embodiment and when block 512 is performed in response to determining, at block 508, that the trigger frame does not indicate that the network interface device 162 is to perform a CCA procedure, block 512 is performed regardless of whether a communication channel (via which the NDP is being transmitted) is busy.

On the other hand, if the network interface device 162 determines, at block 508, that the trigger frame (received at block 504) indicates that the network interface device 162 is to perform the CCA procedure prior to transmitting the NDP, the flow proceeds to block 516. At block 516, the network interface device 162 performs the CCA operation to determine whether the communication channel is busy. In an embodiment, performing the CCA operation includes performing one or both of: i) the physical CCA (discussed above), and ii) the virtual CCA (discussed above). In an embodiment, performing the CCA operation includes performing the CCA operation after an end of reception of a PPDU that includes the trigger frame (received at block 504). In an embodiment, performing the CCA operation includes performing at least the physical CCA for a contiguous time period that occurs prior to a time at which the network interface device 162 is to transmit the NDP in response to the trigger frame received at block 504. In an embodiment, performing the virtual CCA includes concluding that the virtual CCA indicates the communication channel is idle even when the NAV timer is non-zero when the network identifier associated with setting the NAV timer corresponds to the AP 114; whereas performing the virtual CCA includes concluding that the virtual CCA indicates the communication channel is busy when the NAV timer is non-zero and when the network identifier associated with setting the NAV timer does not correspond to the AP 114. In an embodiment, performing the CCA operation includes not performing the virtual CCA when the network identifier associated with setting the NAV timer corresponds to the AP 114; whereas performing the CCA operation includes performing the virtual CCA when the network identifier associated with setting the NAV timer does not correspond to the AP 114.

If the network interface device 162 determines, at block 516, that the communication channel is not busy (e.g., the communication channel is idle), the flow proceeds to block 512, at which the network interface device 162 transmits an NDP in response to the trigger frame received at block 504.

On the other hand, if the network interface device 162 determines, at block 516, that the communication channel is busy, the flow proceeds to block 520. At block 520, the network interface device 162 does not transmit an NDP in response to the trigger frame received at block 504.

Referring again to FIGS. 2A, 3A, and 3B, the MU ranging measurement exchange 200/300/350 may be included in a set of multiple MU ranging measurement exchanges 200/300/350 performed so as to obtain multiple ranging measurements, according to some embodiments. As discussed above, the ranging measurement feedback in DL FB frames 244 may correspond to UL NDPs 224 transmitted in a previous MU ranging measurement exchange 200/300/350 in the set of multiple MU ranging measurement exchanges 200/300/350. Similarly, the ranging measurement feedback in UL FB frames 268 may correspond to a DL NDP(s) 236 transmitted in a previous MU ranging measurement exchange 200/300/350 in the set of multiple MU ranging measurement exchanges 200/300/350.

In an embodiment, the AP 114 compares i) values of time of arrival (TOA) and time of departure (TOD) (e.g., $t_1$ and $t_4$) in the UL FB frames 268 received in a particular MU ranging measurement exchange 200/300/350 with ii) values of TOA and TOD (e.g., $t_2$ and $t_3$) recorded by the AP 114 from previous MU ranging measurement exchanges 200/300/350 to determine the appropriate TOA and TOD (e.g., $t_2$ and $t_3$) measurements recorded by the AP 114 that correspond to the TOA and TOD (e.g., $t_1$ and $t_4$) measurements in the UL FB frames 268. Similarly, the client station 154 compares i) values of TOA and TOD (e.g., $t_2$ and $t_3$) in the DL FB frames 244 received in a particular MU ranging measurement exchange 200/300/350 with ii) values of TOA and TOD (e.g., $t_1$ and $t_4$) recorded by the client station 154 from previous MU ranging measurement exchanges 200/300/350 to determine the appropriate TOA and TOD (e.g., $t_1$ and $t_4$) measurements recorded by the client station 154 that correspond to the TOA and TOD (e.g., $t_2$ and $t_3$) measurements in the DL FB frames 244.

In another embodiment, the AP 114 selects different token values for different MU ranging measurement exchanges 200/300/350 in the set of multiple MU ranging measurement exchanges 200/300/350. In an embodiment, the AP 114 includes the selected token value in a field of the trigger frame 216 and/or in a field of the NDPA frame 228. When the AP 114 records TOA and TOD values (e.g., $t_2$ and $t_3$) in connection with a particular MU ranging measurement exchange 200/300/350, the AP 114 associates the recorded TOA and TOD values with the token value corresponding to the particular MU ranging measurement exchange 200/300/350. When the AP 114 generates the DL FB frames 244 that include TOA and TOD values (e.g., $t_2$ and $t_3$), the AP 114 includes in DL FB frames 244 the token value to which the TOA and TOD values correspond.

Similarly, the client station 154 notes the token value for a particular MU ranging measurement exchange 200/300/350 in the trigger frame 216 and/or in the NDPA frame 228; and when the client station 154 records TOA and TOD values (e.g., $t_1$ and $t_4$) in connection with the particular MU ranging measurement exchange 200/300/350, the client station 154 associates the recorded TOA and TOD values with the token value corresponding to the particular MU ranging measurement exchange 200/300/350. When the client station 154 generates the UL FB frame 268 that includes TOA and TOD values (e.g., $t_1$ and $t_4$), the client station 154 includes in the UL FB frame 268 the token value to which the TOA and TOD values correspond.

When the client station 154 receives the DL FB frame 244, the client station 154 uses the token value in the DL FB frame 244 to determine the appropriate TOA and TOD (e.g., $t_1$ and $t_4$) measurements recorded by the client station 154 that correspond to the TOA and TOD (e.g., $t_2$ and $t_3$) measurements in the DL FB frames 244. Similarly, when the AP 114 receives the UL FB frame 268, the AP 114 uses the token value in the UL FB frame 268 to determine the appropriate TOA and TOD (e.g., $t_2$ and $t_3$) measurements recorded by the AP 114 that correspond to the TOA and TOD (e.g., $t_1$ and $t_4$) measurements in the DL FB frames 244.

Figure 6:
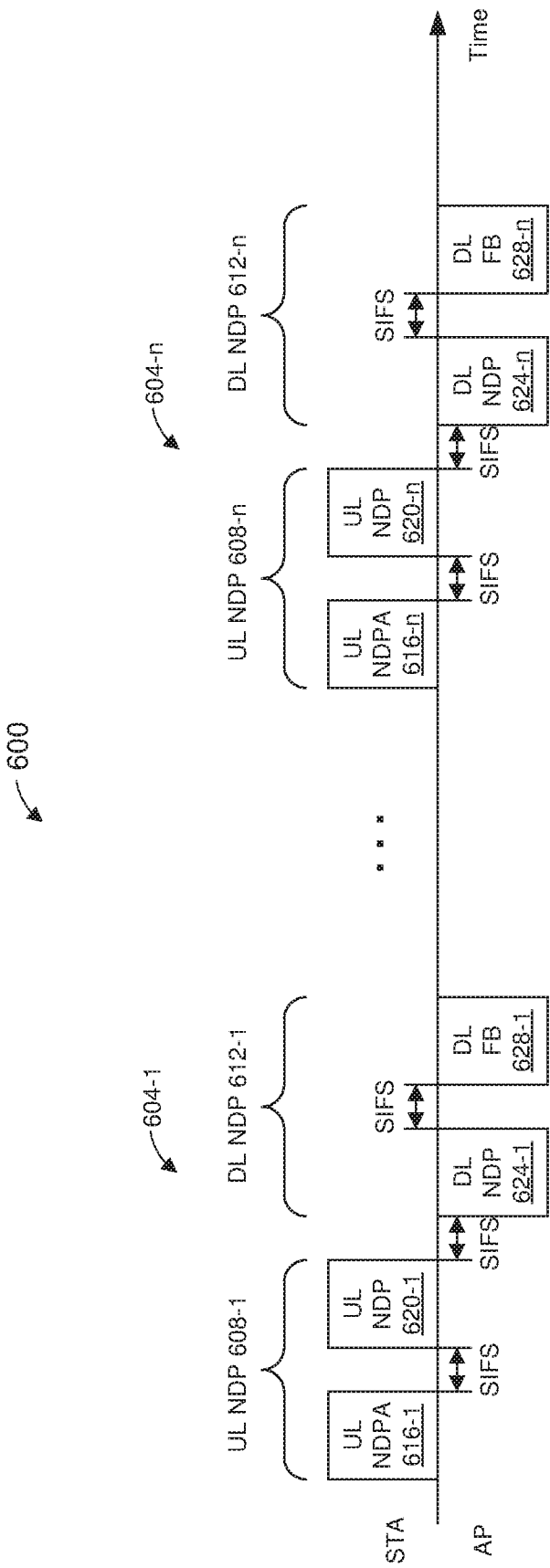
FIG. 6 is a diagram of a set of example single-user (SU) ranging measurement exchanges in an SU ranging measurement procedure, according to an embodiment.

FIG. 6 is a diagram of a set 600 of example single-user (SU) ranging measurement exchanges 604 in an SU ranging measurement procedure, according to an embodiment. The diagram of FIG. 6 is described in the context of the example network 110 merely for explanatory purposes. In some embodiments, signals illustrated in FIG. 6 are generated by other suitable communication devices in other suitable types of wireless networks.

In an embodiment, the set 600 of SU ranging measurement exchanges 604 is transmitted in a single TXOP. In another embodiment, each SU ranging measurement exchange 604 is transmitted within a respective TXOP. In another embodiment, at least two SU ranging measurement exchanges 604 are transmitted within a first TXOP, and one or more other SU ranging measurement exchanges 604 are transmitted within a second TXOP.

Each SU ranging measurement exchange 604 corresponds to a client-initiated SU ranging measurement exchange, according to an embodiment. The SU ranging measurement exchange 604 includes an UL NDP portion 608 and a DL NDP portion 612. In the UL NDP transmission portion 608, a first communication device (e.g., the client station 154) transmits a PPDU 616 that includes an SU UL NDPA having information indicating the initiation of the SU ranging measurement exchange 604. In an embodiment, the SU UL NDPA in the PPDU 616 is a type of NDPA frame specifically for initiating an SU ranging measurement exchange such as the SU ranging measurement exchange 604. The SU UL NDPA in the PPDU 616 causes the AP 114 to be ready to receive an NDP as part of an SU ranging measurement exchange.

The client station 154 then begins transmitting an UL NDP 620 a defined time period after an end of the PPDU 616. In an embodiment, the defined time period is SIFS. In other embodiments, another suitable time period is utilized.

The UL NDP 620 includes PHY preambles having one or more STFs (e.g., an L-STF), one or more LTFs (e.g., an L-LTF and an NL-LTF) and one or more signal fields (e.g., an L-SIG and an NL-SIG), in an embodiment. The UL NDP 620 omits a PHY data portion.

When transmitting the UL NDP 620, the client station 154 records a time $t_1$ at which the client station 154 began transmitting a particular portion the UL NDP 620 (e.g., the NL-LTF). Similarly, when the AP 114 receives the UL NDP 620, the AP 114 records a time $t_2$ at which the AP 114 began receiving the particular portion of the UL NDP 620 (e.g., the NL-LTF).

In some embodiments, when transmitting the UL NDP 620, the client station 154 (e.g., a client station 154 with multiple antennas 174) records an angle of departure, $AoD_1$, at which the UL NDP 616 left the antennas 178 of the client station 154. Similarly, when the AP 114 receives the UL NDP 620, the AP 114 records an angle of arrival, $AoA_1$, at which the UL NDP 616 arrived at the antennas 138 of the AP 114.

The AP 114 generates a DL NDP 624 and, responsive to the UL NDP 620, the AP 114 begins transmitting the DL NDP 624 a defined time period after an end of reception of the UL NDP 620. In an embodiment, the defined time period is SIFS. In other embodiments, another suitable time period is utilized. The DL NDP 624 includes a PHY preamble having one or more STFs, one or more LTFs (e.g., an L-LTF and an NL-LTF) and one or more signal fields (e.g., an L-SIG and an NL-SIG), in an embodiment. The DL NDP 624 omits a PHY data portion.

When transmitting the DL NDP 624, the AP 114 records a time $t_3$ at which the AP 114 began transmitting a particular portion (e.g., the NL-LTF) of the DL NDP 624. Similarly, when the client station 154 receives the DL NDP 624, the client station 154 records a time $t_4$ at which the client station 154 began receiving a particular portion (e.g., the NL-LTF) of the DL NDP 624.

In some embodiments, when transmitting the DL NDP 624, the AP 114 records an $AoD_2$ at which the DL NDP 624 left the antennas 138 of the AP 114. Similarly, when the client station 154 receives the DL NDP 624, the client station 154 records an $AoA_2$ at which the DL NDP 624 arrived at the antennas 178 of the client station 154.

In an embodiment, the AP 114 transmits a DL PPDU 628 a defined time period after an end of the DL NDP 624. In an embodiment, the defined time period is SIFS. In other embodiments, another suitable time period is utilized. The PPDU 628 corresponds to a ranging measurement feedback packet. The PPDU 628 includes the recorded times $t_2$ and $t_3$. In some embodiments, the PPDU 628 respectively includes the recorded angles $AoA_1$ and $AoD_2$. In some embodiments, the PPDU 628 optionally also includes respective channel estimate information determined by the AP 114 based on reception of the UL NDP 620.

In another embodiment, the ranging measurement feedback packet in the PPDU 628 includes feedback information regarding a previous SU ranging measurement exchange 604. For example, the PPDU 628 includes the recorded times $t_2$ and $t_3$ of NDPs in the previous SU ranging measurement exchange 604. In some embodiments, the PPDU 628 respectively includes the recorded angles $AoA_1$ and $AoD_2$ of NDPs in the previous SU ranging measurement exchange 604. In some embodiments, the PPDU 628 optionally also includes respective channel estimate information determined by the AP 114 based on reception of an UL NDP in the previous SU ranging measurement exchange 604.

After receipt of the PPDU 628, the client station 154 calculates a time-of-flight between the AP 114 and the client station 154 using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the AP 114 and the client station 154 may be calculated using the calculated times-of-flight, e.g., by respectively multiplying the times-of-flight by the speed of light, according to an embodiment.

In some embodiments, the client station 154 calculates an estimated position of the client station using the calculated time-of-flight. For example, the client station 154 uses triangulation techniques to calculate an estimated position of the client station 154 using the calculated time-of-flight. In some embodiments, the client station 154 calculates an estimated positions of the client station also using the recorded angles $AoD_1$, $AoA_1$, $AoD_2$, and $AoA_2$. For example, the recorded angles $AoD_1$, $AoA_1$, $AoD_2$, and $AoA_2$ are used as part of a triangulation algorithm for determining positions of communication devices.

In an embodiment, the client station 154 compares i) values of TOA and TOD (e.g., $t_1$ and $t_4$) in the DL FB frame 628 received in a particular SU ranging measurement exchange 604 with ii) values of TOA and TOD (e.g., $t_2$ and $t_3$) recorded by the client station 154 from previous SU ranging measurement exchanges 604 to determine the appropriate TOA and TOD (e.g., $t_1$ and $t_4$) measurements recorded by the client station 154 that correspond to the TOA and TOD (e.g., $t_2$ and $t_3$) measurements in the UL FB frame 628.

In another embodiment, the client station 154 selects different token values for different SU ranging measurement exchanges 604 in the set 600 of multiple SU ranging measurement exchanges 604. In an embodiment, the client station 154 includes the selected token value in a field of the UL NDPA frame 616. When the client station 154 records TOA and TOD values (e.g., $t_1$ and $t_4$) in connection with a particular SU ranging measurement exchange 604, the client station 154 associates the recorded TOA and TOD values with the token value corresponding to the particular SU ranging measurement exchange 604.

Similarly, the AP 114 notes the token value for a particular SU ranging measurement exchange 604 in the NDPA frame 616; and when the AP 114 records TOA and TOD values (e.g., $t_2$ and $t_3$) in connection with the particular SU ranging measurement exchange 604, the AP 114 associates the recorded TOA and TOD values with the token value corresponding to the particular SU ranging measurement exchange 604. When the AP 114 generates the DL FB frame 628 that includes TOA and TOD values (e.g., $t_2$ and $t_3$), the AP 114 includes in the DL FB frame 628 the token value to which the TOA and TOD values correspond.

When the client station 154 receives the DL FB frame 628, the client station 154 uses the token value in the DL FB frame 628 to determine the appropriate TOA and TOD (e.g., $t_1$ and $t_4$) measurements recorded by the client station 154 that correspond to the TOA and TOD (e.g., $t_2$ and $t_3$) measurements in the DL FB frames 628.

Responsive to receipt of the DL PPDU 628, the client station 154 generates an UL PPDU (not shown) that includes an ACK frame, according to an embodiment. The client station 154 transmits the UL PPDU having the ACK frame a defined time period after an end of the DL PPDU 628. In an embodiment, the defined time period is SIFS. In other embodiments, another suitable time period is utilized.

In another embodiment, the client station 154 does not generate and transmit an UL PPDU having an ACK frame even when the client station 154 successfully receives the DL PPDU 628.

In an embodiment, the network interface device 122 of the AP 114 transmits the DL NDP 624 a defined time period (e.g., SIFS) after an end of reception of the UL NDP 620 and in response to the UL NDP 620. In an embodiment, the network interface device 122 transmits the DL NDP 624 without first performing a CCA operation in connection with transmitting the DL NDP 624. In an embodiment, the network interface device 122 transmits the DL NDP 624 regardless of whether a communication channel (via which the NDP is being transmitted) is busy.

In another embodiment, the network interface device 162 performs a CCA operation in connection with transmitting the DL NDP 624 and does not transmit the DL NDP 624 if the CCA operation indicates that the communication channel is busy; whereas the network interface device 162 transmits the DL NDP 624 if the CCA operation indicates that the communication channel is idle. In an embodiment, the CCA operation includes a physical CCA and a virtual CCA. In an embodiment, the network interface device 162 performs the physical CCA during a time period immediately prior to reception of the UL NDPA 616. In an embodiment, the time period immediately prior to reception of the UL NDPA 616 has a duration equal to a point coordination function (PCF) interframe space (PIFS) as defined by the IEEE 802.11 Standard or another suitable time duration, such as SIFS. In an embodiment, the network interface device 162 performs the physical CCA during a time period prior to reception of the UL NDP 620. In an embodiment, the time period prior to reception of the UL NDP 620 has a duration equal to SIFS or another suitable time duration. In an embodiment, the network interface device 162 performs the physical CCA during a time period prior to transmission of the DL NDP 624. In an embodiment, the time period prior to transmission of the DL NDP 624 has a duration equal to SIFS or another suitable time duration.

In an embodiment, performing the virtual CCA includes concluding that the virtual CCA indicates the communication channel is idle even when the NAV timer is non-zero when the network identifier associated with setting the NAV timer corresponds to the client station 154; whereas performing the virtual CCA includes concluding that the virtual CCA indicates the communication channel is busy when the NAV timer is non-zero and when the network identifier associated with setting the NAV timer does not correspond to the client station 154. In an embodiment, performing the CCA operation includes not performing the virtual CCA when the network identifier associated with setting the NAV timer corresponds to the client station 154; whereas performing the CCA operation includes performing the virtual CCA when the network identifier associated with setting the NAV timer does not correspond to the client station 154.

In an embodiment, each SU ranging measurement exchange 604 corresponds to a frame exchange, i.e., a sequence of frames. In an embodiment, if the client station 154 receives both the DL NDP 624 and DL FB 628 correctly, the client station 154 determines i) that the SU ranging measurement was successful, and ii) that the frame exchange was successful. In an embodiment, if the client station 154 receives the DL NDP 624 correctly but does not receive the DL FB 628 correctly, the client station 154 determines i) that the SU ranging measurement was not successful, but ii) that the frame exchange was successful. In an embodiment, if the client station 154 does not receive the DL NDP 624 correctly but receives the DL FB 628 correctly, the client station 154 determines i) that the SU ranging measurement was not successful, but ii) that the frame exchange was successful. In an embodiment, if the client station 154 does not receive the DL NDP 624 correctly and also does not receive the DL FB 628 correctly, the client station 154 determines i) that the SU ranging measurement was not successful, and ii) that the frame exchange was not successful. In another embodiment, if the client station 154 does not receive the DL NDP 624 correctly and/or does not receive the DL FB 628 correctly, the client station 154 determines i) that the SU ranging measurement was not successful, and ii) that the frame exchange was not successful.

In an embodiment, when the client station 154 determines that the SU ranging measurement was not successful, the client station 154 does not use any measurements made in connection with the SU ranging measurement exchange 604 for determining a time of flight and/or a distance. In an embodiment, when the client station 154 determines that the frame exchange was not successful was not successful, the client station 154 does not use any measurements made in connection with the SU ranging measurement exchange 604 for determining a time of flight and/or a distance.

In some embodiments, the client station 154 and/or the AP 114 employs a backoff procedure in connection with one or more transmissions in the set 600 of SU ranging measurement exchanges 604, at least in some situations. In an embodiment, the backoff process involves the use of a backoff counter or timer. While the communication device determines that the channel medium is idle, the communication device decrements the backoff timer. When the communication device determines that the communication medium is busy, the communication device pauses the backoff timer and does not resume decrementing the backoff timer until the communication medium is subsequently determined to be idle. The backoff timer is set to a value chosen randomly or pseudo-randomly so that backoff timers of different communication devices in the network tend to reach zero at different times. Generally, if the communication medium is still idle when the backoff timer reaches zero, the communication device determines that the communication device is free to transmit. On the other hand, if the communication medium is busy when the backoff timer reaches zero, the communication device resets the backoff timer and the process repeats. In an embodiment, determining whether the channel medium is idle includes measuring an energy level in the channel medium and comparing the measured energy level to a threshold. When the measured energy level is less than the threshold, the channel medium is determined to be idle; whereas when the measured energy level meets the threshold, the channel medium is determined to be busy, according to an embodiment.

In an embodiment, setting the backoff timer includes randomly or pseudorandomly choosing an initial value for the backoff timer from a range of initial values. In an embodiment, the range of initial values is [0, CW], where CW is a contention window parameter, where the initial value and CW are in units of a slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax. The parameters CWmin and CWmax are also in units of slots. In an embodiment, the backoff timer is decremented in units of slots.

In some embodiments, the client station 154 and/or the AP 114 employs an error recovery procedure (sometimes referred to herein as the "PIFS recovery procedure") in connection with one or more transmissions in the set 600 of SU ranging measurement exchanges 604, at least in some situations. In an embodiment, the PIFS recovery procedure involves determining whether the channel medium is idle for a time period that corresponds to a slot time after the channel medium transitioned from being busy to being idle. When the channel medium is determined to be idle for the slot time after the channel medium transitioned from being busy to being idle, the PIFS recovery procedure indicates that a next SU ranging measurement exchanges 604 in the set 600 can commence, according to an embodiment.

In an embodiment, when the client station 154 determines that a frame exchange 604 was successful, the client station 154 determines that a next occurring frame exchange 604 can commence without first performing a backoff procedure if there is adequate time left in a TXOP for the next occurring frame exchange 604. For example, when the client station 154 determines that the frame exchange 604 was successful and when there is adequate time left in a TXOP for the next occurring frame exchange 604, the client station 154 determines that the UL NDPA 616 in the next occurring frame exchange 604 can be transmitted a predetermined time period (e.g., SIFS or another suitable time period) after reception of the DL FB 628 in the frame exchange 604 has ended.

In an embodiment, when the client station 154 determines that a first occurring frame exchange 604 was successful, the client station 154 determines that a next occurring frame exchange 604 can commence without first performing a backoff procedure if there is adequate time left in a TXOP for the next occurring frame exchange 604. For example, when the client station 154 determines that the first occurring frame exchange 604 was successful and when there is adequate time left in a TXOP for the next occurring frame exchange 604, the client station 154 determines that the UL NDPA 616 in the next occurring frame exchange 604 can be transmitted a predetermined time period (e.g., SIFS or another suitable time period) after reception of the DL FB 628 in the first occurring frame exchange 604 has ended.

In an embodiment, when the client station 154 determines i) that a frame exchange 604 was successful and ii) that there is adequate time left in a TXOP for a next occurring frame exchange 604, the client station 154 determines that the next occurring frame exchange 604 can commence after performing a backoff procedure using CWmin (e.g., the backoff timer is initialized with CWmin, and the backoff timer decrements for each slot time during which the communication medium is idle). For example, when the client station 154 determines that a frame exchange 604 was successful and if there is adequate time left in a TXOP for a next occurring frame exchange 604, the client station 154 determines that the UL NDPA 616 in the next occurring frame exchange 604 can be transmitted after performing a backoff procedure using CWmin.

Figure 7:
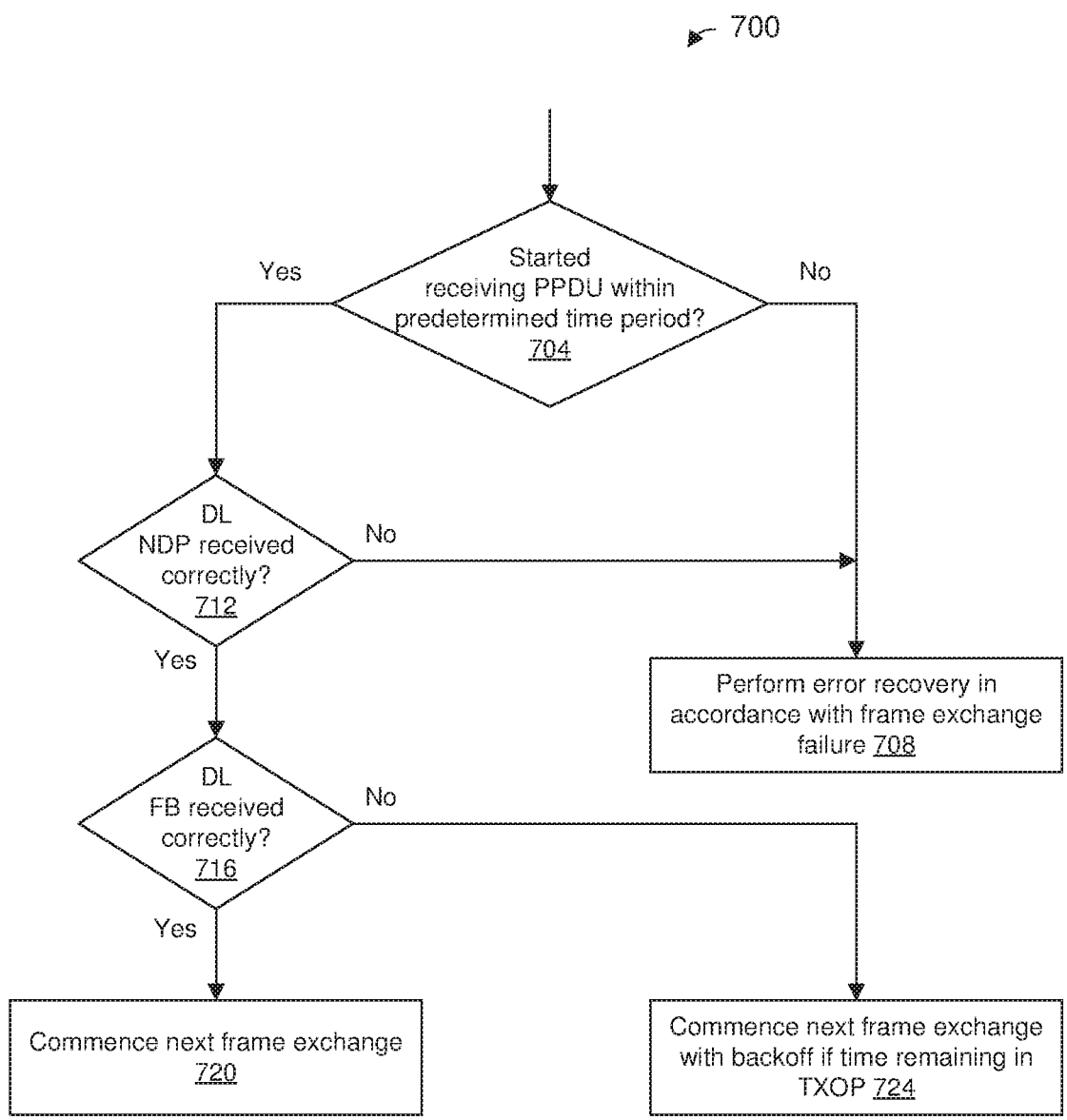
FIG. 7 is a flow diagram of an example method performed by a communication device in connection with an SU ranging measurement exchange, according to an embodiment.

FIG. 7 is a flow diagram of an example method 700 performed by a communication device (e.g., performed by the network interface 162 of the client station 154) in connection with an SU ranging measurement exchange 604, according to an embodiment. FIG. 7 is described in the context of the network interface device 162 of the client station 154 merely for explanatory purposes. In other embodiments, the method 700 is performed by another suitable communication device (e.g., the network interface 122 of the AP 114 or another suitable network interface device). FIG. 7 is also described in the context of the set 600 of SU ranging measurement exchanges 604 of FIG. 6 merely for explanatory purposes. In other embodiments, the method 700 is performed in the context of other suitable SU ranging measurement exchanges.

The method 700 commences in connection with transmission of the UL NDPA 616 and the UL NDP 620. At block 704, the network interface device 162 determines whether the network interface device 162 has begun receiving a PPDU during a predetermined time period after an end of transmission of the UL NDP 620. In an embodiment, the predetermined time period corresponds to an expected time in which to begin receiving the DL NDP 624 as part of the frame exchange 604. In an embodiment, the predetermined time period corresponds to aSIFSTime+aSlotTime+aRxPHYStartDelay, where: aSIFSTime is a nominal time (e.g., in microseconds) required by wireless network interfaces in the network 110 (FIG. 1) in order to receive a last symbol of a frame on a communication medium, process the frame, and respond with a first symbol on the communication medium of an earliest possible response frame; aSlotTime is a Slot Time (e.g., in microseconds) used by network interfaces in the network 110; and aRxPHYStartDelay is a delay (e.g., in microseconds) from the start of the PPDU at a receiver's antenna to an issuance of an indication primitive by the PHY processor 170 (FIG. 1) that the PHY processor 170 began receiving a PPDU.

If the network interface device 162 determines that the network interface device 162 did not begin receiving a PPDU during the predetermined time period after the end of transmission of the UL NDP 620, the flow proceeds to block 708. At block 708, the client station 154 determines that the frame exchange 604 failed and performs an error recovery procedure in accordance with a frame exchange failure. For example, in an embodiment, the network interface device 162 performs a backoff procedure and retransmits the UL NDPA 616 and the UL NDP 620 in connection with performing the backoff procedure. In an embodiment, the network interface device 162 performs the backoff procedure and retransmits the UL NDPA 616 and the UL NDP 620 in a subsequent TXOP, e.g., in a TXOP that is different than a TXOP in which the UL NDPA 616 and the UL NDP 620 were previously transmitted. In another embodiment, the network interface device 162 performs a backoff procedure and transmits, in connection with performing the backoff procedure, a UL NDPA 616 and a UL NDP 620 corresponding to a next frame exchange 604. In an embodiment, the network interface device 162 performs the backoff procedure and transmits the UL NDPA 616 and the UL NDP 620 in a subsequent TXOP, e.g., in a TXOP that is different than a TXOP in which the UL NDPA 616 and the UL NDP 620 for the previous frame exchange 604 were previously transmitted. In an embodiment, when transmitting the UL NDPA 616 in a subsequent TXOP, the backoff procedure includes setting the backoff timer to CWmin.

On the other hand, if the network interface device 162 determines, at block 704, that the network interface device 162 began receiving a PPDU during the predetermined time period after the end of transmission of the UL NDP 620, the flow proceeds to block 712. At block 712, the network interface device 162 determines whether the network interface device 162 received the DL NDP 624 correctly. If the network interface device 162 determines that the network interface device 162 did not receive the DL NDP 624 correctly, the flow proceeds to block 708.

On the other hand, if the network interface device 162 determines, at block 712, that the network interface device 162 received the DL NDP 624 correctly, the flow proceeds to block 716. At block 716, the network interface device 162 determines whether the network interface device 162 received the DL FB 628 correctly. If the network interface device 162 determines that the network interface device 162 received the DL FB 628 correctly, the flow proceeds to block 720.

At block 720, the network interface device 720 commences a next SU ranging measurement exchange 604 in the set 600. In an embodiment, the network interface device 720 commences the next SU ranging measurement exchange 604 if there is enough time remaining in a TXOP to complete the next SU ranging measurement exchange 604. In an embodiment, the network interface device 720 commences the next frame exchange 604 without first performing a backoff procedure if there is adequate time left in the TXOP for the next occurring frame exchange 604. For example, when the network interface device 720 determines there is adequate time left in a TXOP for the next occurring frame exchange 604, the network interface device 720 determines that the UL NDPA 616 in the next occurring frame exchange 604 can be transmitted a predetermined time period (e.g., SIFS or another suitable time period) after reception of the DL FB 628 in the frame exchange 604 has ended.

On the other hand, if the network interface device 162 determines, at block 716, that the network interface device 162 did not receive the DL FB 628 correctly, the flow proceeds to block 724. At block 724, the client station 154 determines that the ranging measurement failed and performs an error recovery procedure in accordance with a ranging measurement failure. For example, in an embodiment, the network interface device 162 performs a backoff procedure and transmits, in connection with performing the backoff procedure, a UL NDPA 616 and a UL NDP 620 corresponding to a next frame exchange 604 if there is adequate time in the TXOP to complete the next frame exchange 604. In an embodiment, if there is not adequate time in the TXOP to complete the next frame exchange 604, the network interface device 162 performs the backoff procedure and transmits the UL NDPA 616 and the UL NDP 620 of the next frame exchange 604 in a subsequent TXOP. In an embodiment, when transmitting the UL NDPA 616 in a subsequent TXOP, the backoff procedure includes setting the backoff timer to CWmin.

In another embodiment, block 724 includes the network interface device 162 performing a PIFS recovery procedure and transmitting, in connection with performing the PIFS recovery procedure, a UL NDPA 616 and a UL NDP 620 corresponding to a next frame exchange 604 if there is adequate time in the TXOP to complete the next frame exchange 604. In an embodiment, if there is not adequate time in the TXOP to complete the next frame exchange 604, the network interface device 162 performs the backoff procedure and transmits the UL NDPA 616 and the UL NDP 620 of the next frame exchange 604 in a subsequent TXOP. In an embodiment, when transmitting the UL NDPA 616 in a subsequent TXOP, the backoff procedure includes setting the backoff timer to CWmin.

In another embodiment, if the network interface device 162 determines, at block 716, that the network interface device 162 did not receive the DL FB 628 correctly, the flow proceeds to block 708, and block 724 is omitted.

Figure 8:
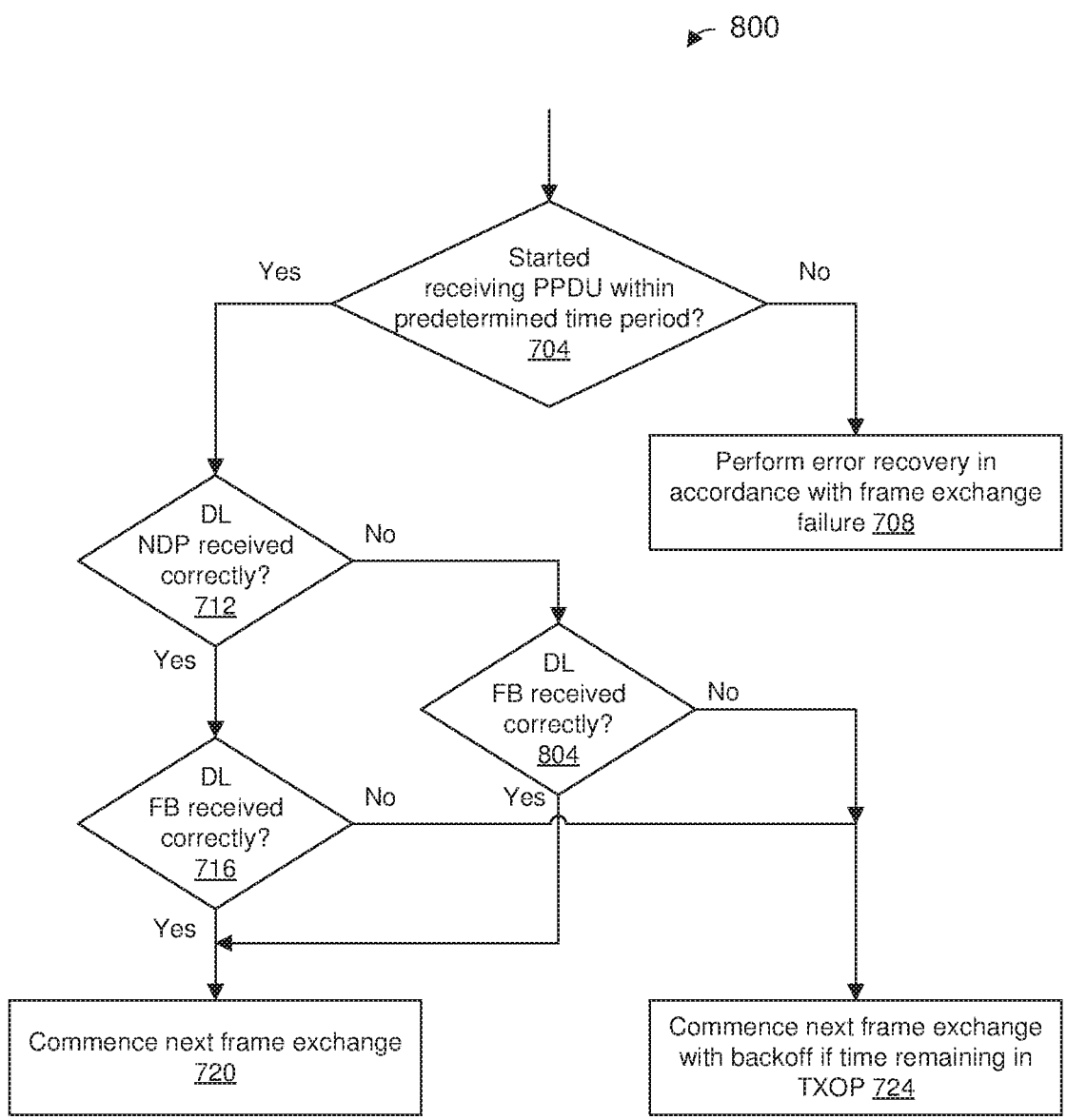
FIG. 8 is a flow diagram of another example method performed by a communication device in connection with an SU ranging measurement exchange, according to another embodiment.

FIG. 8 is a flow diagram of another example method 800 performed by a communication device (e.g., performed by the network interface 162 of the client station 154) in connection with an SU ranging measurement exchange 604, according to an embodiment. FIG. 8 is described in the context of the network interface device 162 of the client station 154 merely for explanatory purposes. In other embodiments, the method 800 is performed by another suitable communication device (e.g., the network interface 122 of the AP 114 or another suitable network interface device). FIG. 8 is also described in the context of the set 600 of SU ranging measurement exchanges 604 of FIG. 6 merely for explanatory purposes. In other embodiments, the method 800 is performed in the context of other suitable SU ranging measurement exchanges.

The method 800 is similar to the method 700 of FIG. 7, and like-numbered elements are not discussed in detail for purposes of brevity.

Similar to the method 700 of FIG. 7, the method 800 commences in connection with transmission of the UL NDPA 616 and the UL NDP 620.

At block 712, if the network interface device 162 determines that the network interface device 162 did not receive the DL NDP 624 correctly, the flow proceeds to block 804. At block 804, the network interface device 162 determines whether the network interface device 162 received the DL FB 628 correctly. If the network interface device 162 determines, at block 804, that the network interface device 162 received the DL FB 628 correctly, the flow proceeds to block 720. On the other hand, if the network interface device 162 determines, at block 804, that the network interface device 162 did not receive the DL FB 628 correctly, the flow proceeds to block 724.

Figure 9:
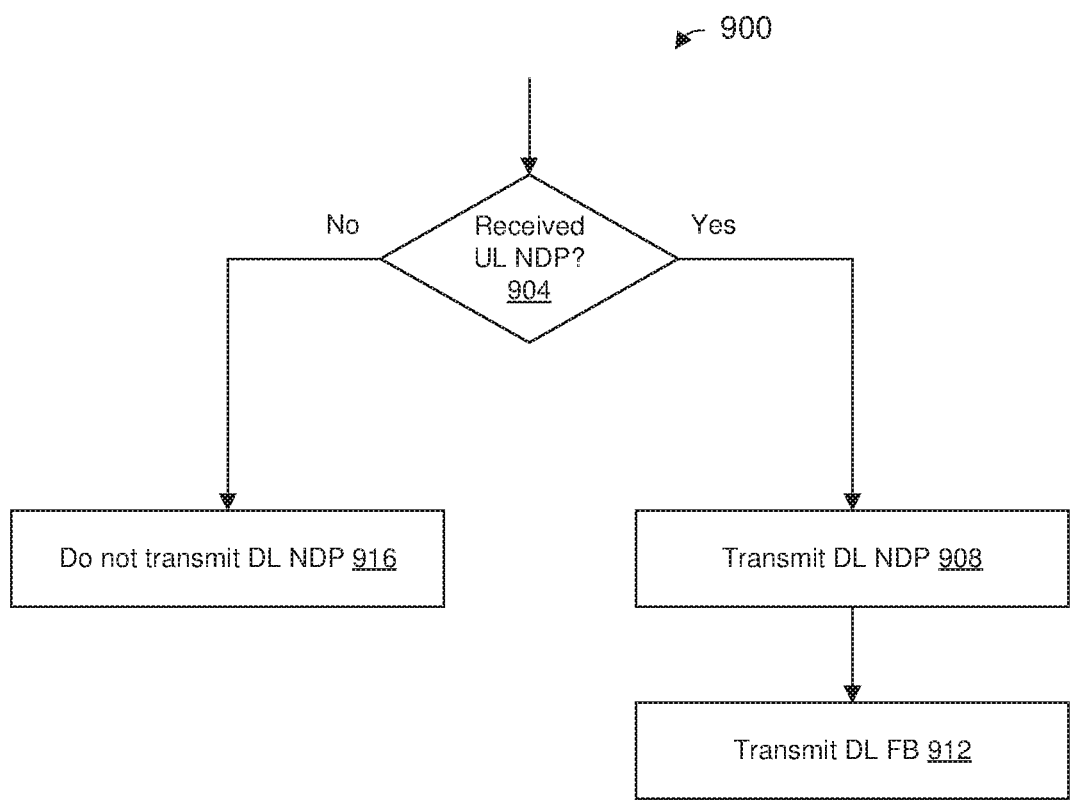
FIG. 9 is a flow diagram of another example method performed by a communication device in connection with an SU ranging measurement exchange, according to another embodiment.

FIG. 9 is a flow diagram of an example method 900 performed by a communication device (e.g., performed by the network interface 122 of the AP 114) in connection with an SU ranging measurement exchange 604, according to an embodiment. FIG. 9 is described in the context of the network interface device 122 of the AP 114 merely for explanatory purposes. In other embodiments, the method 900 is performed by another suitable communication device (e.g., the network interface 162 of the client station 154 or another suitable network interface device). FIG. 9 is also described in the context of the set 600 of SU ranging measurement exchanges 604 of FIG. 6 merely for explanatory purposes. In other embodiments, the method 900 is performed in the context of other suitable SU ranging measurement exchanges.

The method 900 commences in connection with reception of the UL NDPA 616 by the AP 114. At block 904, the network interface device 122 determines whether the network interface device 122 received the UL NDP 620 correctly. In an embodiment, block 904 includes determining whether the network interface device 122 began receiving a PPDU during a predetermined time period after an end of reception of the UL NDPA 616. In an embodiment, the predetermined time period corresponds to an expected time in which to begin receiving the UL NDP 620 as part of the frame exchange 604. In an embodiment, the predetermined time period corresponds to aSIFSTime+aSlotTime. If the network interface device 122 determines that the network interface device 122 did not begin receiving a PPDU during the predetermined time period after an end of transmission of the UL NDPA 616, the network interface device 122 determines that the network interface device 122 did not receive the UL NDP 620 correctly.

On the other hand, in an embodiment, the network interface device 122 determines that the network interface device 122 began receiving a PPDU during the predetermined time period after an end of transmission of the UL NDPA 616, the network interface device 122 determines whether the UL NDP 620 was received correctly.

If the network interface device 122 determines that the UL NDP 620 was received correctly, the flow proceeds to block 908. At block 908, the network interface device 122 transmits the DL NDP 624 as part of the SU ranging measurement exchange. At block 912, the network interface device 122 transmits the DL FB 628 as part of the SU ranging measurement exchange.

On the other hand, if the network interface device 122 determines that the UL NDP 620 was not received correctly, the flow proceeds to block 916. At block 916, the network interface device 122 does not transmit the DL NDP 624. Additionally, the network interface device 122 does not transmit the DL FB 628.

Figure 10:
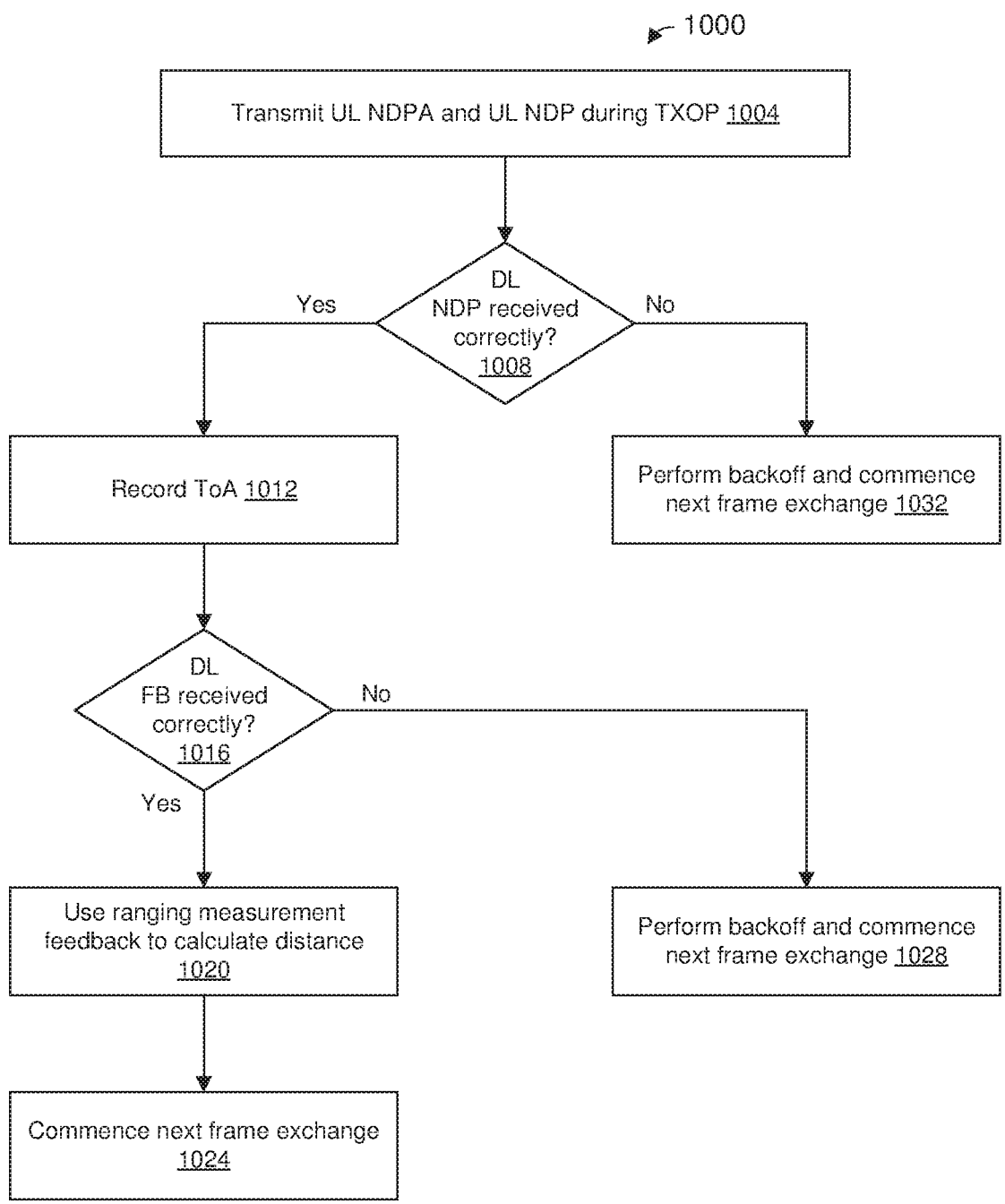
FIG. 10 is a flow diagram of an example method for performing ranging measurement exchanges, according to an embodiment.

FIG. 10 is a flow diagram of an example method for performing range measurement exchanges (e.g., SU range measurement exchanges), according to an embodiment. FIG. 10 is described in the context of the network interface device 162 of the client station 154 merely for explanatory purposes. In other embodiments, the method 1000 is performed by another suitable communication device (e.g., the network interface 122 of the AP 114 or another suitable network interface device). FIG. 10 is also described in the context of the set 600 of SU ranging measurement exchanges 604 of FIG. 6 merely for explanatory purposes. In other embodiments, the method 1000 is performed in the context of other suitable ranging measurement exchanges.

At block 1004, the network interface device 162 transmits an NDPA (e.g., the UL NDPA 616) and an NDP (e.g., the UL NDP 620) as part of a ranging measurement exchange (e.g., the SU ranging measurement exchange 604) among a set (e.g., the set 600) of ranging measurement exchanges. In an embodiment, the network interface device 162 transmits the NDPA and the NDP during a TXOP.

In an embodiment, block 1004 includes generating the NDPA to include a token that is associated with the ranging measurement exchange and that is different than tokens associated with other ranging measurement exchanges in the set of ranging measurement exchanges.

Block 1004 includes recording a ToD (e.g., $t_1$) corresponding to the transmission of the NDP. In an embodiment in which the network interface device 162 associates the ranging measurement exchange with a token, block 1004 includes the network interface device 162 associating the recorded ToD with the token that is associated with the ranging measurement exchange.

At block 1008, the network interface device 162 determines whether an NDP (e.g., the DL NDP 624) was received i) in response to the NDP transmitted at block 1004 and ii) as part of the ranging measurement exchange. In an embodiment, block 1008 includes determining whether the network interface device 162 began receiving a PPDU during a predetermined time period after an end of transmission of the NDP at block 1004. In an embodiment, the predetermined time period corresponds to an expected time in which to begin receiving the DL NDP 624 as part of the frame exchange 604. In an embodiment, the predetermined time period corresponds to aSIFSTime+aSlotTime+aRxPHYStartDelay. In an embodiment, if the network interface device 162 determines that the network interface device 162 did not begin receiving a PPDU during the predetermined time period after the end of transmission of the NDP at block 1004, the network interface device 162 determines, at block 1008, that the network interface device 162 did not receive the DL NDP correctly.

In an embodiment, when an NDP is received in connection with block 1008, block 1008 includes determining whether the network interface device 162 can correctly decode one or more signal fields in a PHY preamble of the received NDP. In an embodiment, if the network interface device 162 cannot correctly decode the one or more signal fields in the PHY preamble of the received NDP, the network interface device 162 determines, at block 1008, that the network interface device 162 did not receive the DL NDP correctly. On the other hand, if the network interface device 162 can correctly decode the one or more signal fields in the PHY preamble of the received NDP, the network interface device 162 determines, at block 1008, that the network interface device 162 received the DL NDP correctly, according to an embodiment.

If the network interface device 162 determines, at block 1008, that the network interface device 162 received the DL NDP correctly, the flow proceeds to block 1012. At block 1012, the network interface device 162 records a ToA (e.g., $t_4$) corresponding to the reception of the NDP at block 1008. In an embodiment in which the network interface device 162 associates the ranging measurement exchange with a token, block 1008 includes the network interface device 162 associating the recorded ToA with the token that is associated with the ranging measurement exchange.

At block 1016, the network interface device 162 determines whether a PPDU including ranging measurement feedback (e.g., the DL FB 628) was received as part of the ranging measurement exchange. In an embodiment, block 1016 includes determining whether the network interface device 162 began receiving a PPDU during a predetermined time period after an end of reception of the NDP corresponding to block 1008. In an embodiment, the predetermined time period corresponds to an expected time in which to begin receiving the DL FB 628 as part of the frame exchange 604. In an embodiment, the predetermined time period corresponds to aSIFSTime+aSlotTime. In an embodiment, if the network interface device 162 determines that the network interface device 162 did not begin receiving a PPDU during the predetermined time period after the end of reception of the NDP corresponding to block 1008, the network interface device 162 determines, at block 1016, that the network interface device 162 did not receive the PPDU having the ranging measurement feedback correctly.

In an embodiment, when a PPDU is received in connection with block 1016, block 1016 includes determining whether the network interface device 162 can correctly decode information in the PPDU correctly. In an embodiment, if the network interface device 162 cannot correctly decode information in the PPDU, the network interface device 162 determines, at block 1016, that the network interface device 162 did not receive the PPDU including ranging measurement feedback (e.g., the DL FB 628) correctly. On the other hand, if the network interface device 162 can correctly decode the information in PPDU, the network interface device 162 determines, at block 1016, that the network interface device 162 received the PPDU including ranging measurement feedback (e.g., the DL FB 628) correctly, according to an embodiment.

If the network interface device 162 determines, at block 1016, that the network interface device 162 received the PPDU including ranging measurement feedback (e.g., the DL FB 628) correctly, the flow proceeds to block 1020. At block 1020, the network interface device 162 uses the ranging measurement feedback received in connection with block 1016 to calculate a distance measurement. In an embodiment in which the PPDU that includes the ranging measurement feedback received in connection with block 1016 includes a token, block 1020 includes using the token in the PPDU to determine a recorded ToD and a recorded ToA that corresponds to the token.

At block 1024, the network interface device 162 commences a next ranging measurement exchange in the set of ranging measurement exchanges. In an embodiment, if there is adequate time in the TXOP to complete the next ranging measurement exchange in the set (e.g., the set 600), the network interface device 162 commences the next ranging measurement exchange without performing a backoff procedure. In an embodiment, if there is not adequate time in the TXOP to complete the next ranging measurement exchange in the set (e.g., the set 600), the network interface device 162 commences the next ranging measurement exchange in a subsequent TXOP after performing a backoff procedure. In an embodiment, if there is not adequate time in the TXOP to complete the next ranging measurement exchange in the set (e.g., the set 600), the network interface device 162 commences the next ranging measurement exchange in a subsequent TXOP after performing a backoff procedure in which CW is set to CWmin.

If the network interface device 162 determines, at block 1016, that the network interface device 162 did not receive the PPDU including ranging measurement feedback (e.g., the DL FB 628) correctly, the flow proceeds to block 1028. At block 1028, the network interface device 162 commences a next ranging measurement exchange in the set of ranging measurement exchanges. In an embodiment, if there is adequate time in the TXOP to complete the next ranging measurement exchange in the set (e.g., the set 600), the network interface device 162 commences the next ranging measurement exchange after performing a backoff procedure. In an embodiment, if there is adequate time in the TXOP to complete the next ranging measurement exchange in the set (e.g., the set 600), the network interface device 162 commences the next ranging measurement exchange after performing a PIFS recovery procedure. In an embodiment, if there is not adequate time in the TXOP to complete the next ranging measurement exchange in the set (e.g., the set 600), the network interface device 162 commences the next ranging measurement exchange in a subsequent TXOP after performing a backoff procedure.

If the network interface device 162 determines, at block 1008, that the network interface device 162 did not receive the NDP (e.g., the DL NDP 624) correctly, the flow proceeds to block 1032. At block 1032, the network interface device 162 commences a next ranging measurement exchange in the set of ranging measurement exchanges. In an embodiment, if there is adequate time in the TXOP to complete the next ranging measurement exchange in the set (e.g., the set 600), the network interface device 162 commences the next ranging measurement exchange after performing a backoff procedure. In an embodiment, if there is adequate time in the TXOP to complete the next ranging measurement exchange in the set (e.g., the set 600), the network interface device 162 commences the next ranging measurement exchange after performing a PIFS recovery procedure. In an embodiment, if there is not adequate time in the TXOP to complete the next ranging measurement exchange in the set (e.g., the set 600), the network interface device 162 commences the next ranging measurement exchange in a subsequent TXOP after performing a backoff procedure.

Embodiment 1

A method, comprising: transmitting, by a first communication device, a first physical layer protocol data units (PPDU) that includes a first null data packet announcement (NDPA) frame as part of a first ranging measurement exchange, wherein the first ranging measurement exchange is among a set of ranging measurement exchanges; transmitting, by the first communication device, a first null data packet (NDP) as part of the first ranging measurement exchange; recording, by the first communication device, a transmit time of the first NDP; determining, by the first communication device, whether a second NDP was received correctly from a second communication device as part of the first ranging measurement exchange; and in response to determining that the second NDP was not received correctly, commencing, by the first communication device, a second ranging measurement exchange, including transmitting a second PPDU that includes a second NDPA frame as part of the second ranging measurement exchange, wherein the second ranging measurement exchange is among the set of ranging measurement exchanges.

Embodiment 2

The method of embodiment 1, wherein: determining whether the second NDP was received correctly includes determining, by the first communication device, whether the first communication device began receiving the second NDP within an expected time period; the method further comprises: in response to determining that the first communication device did not begin receiving the second NDP within the expected time period, performing, by the first communication device, a backoff operation; and the second ranging measurement exchange is commenced after the backoff operation.

Embodiment 3

The method of embodiment 1, wherein: determining whether the second NDP was received correctly includes determining, by the first communication device, whether the first communication device began receiving the second NDP within an expected time period; the method further comprises: in response to determining that the first communication device did not begin receiving the second NDP within the expected time period, determining, by the first communication device, whether a channel medium is idle for a predetermined time period; and the second ranging measurement exchange is commenced in response to determining that the channel medium is idle for the predetermined time period.

Embodiment 4

The method of any of embodiments 1-3 wherein: determining whether the second NDP was received correctly includes determining, by the first communication device, whether the first communication device correctly decoded one or more signal fields in the second NDP; the method further comprises: in response to determining that the first communication device did not correctly decode the one or more signal fields in the second NDP, performing, by the first communication device, a backoff operation; and the second ranging measurement exchange is commenced after the backoff operation.

Embodiment 5

The method of any of embodiments 1-3, wherein: determining whether the second NDP was received correctly includes determining, by the first communication device, whether the first communication device correctly decoded one or more signal fields in the second NDP; the method further comprises: in response to determining that the first communication device did not correctly decode the one or more signal fields in the second NDP, determining, by the first communication device, whether a channel medium is idle for a predetermined time period; and the second ranging measurement exchange is commenced in response to determining that the channel medium is idle for the predetermined time period.

Embodiment 6

The method of any of embodiments 1-5, further comprising: receiving, by the first communication device, the second NDP correctly; recording, by the first communication device, a receive time of the second NDP; determining, by the first communication device, whether a third PPDU was received correctly as part of the first ranging measurement exchange, wherein the third PPDU includes ranging measurement feedback from the second communication device; and in response to determining that the third PPDU was not received correctly, commencing, by the first communication device, the second ranging measurement exchange, including transmitting the second PPDU that includes the second NDPA frame as part of the second ranging measurement exchange.

Embodiment 7

The method of embodiment 6, further comprising: in response to determining that the third PPDU was not received correctly, performing, by the first communication device, a backoff operation; and the second ranging measurement exchange is commenced after the backoff operation.

Embodiment 8

The method of embodiment 6, further comprising: in response to that the third PPDU was not received correctly, determining, by the first communication device, whether a channel medium is idle for a predetermined time period; and the second ranging measurement exchange is commenced in response to determining that the channel medium is idle for the predetermined time period.

Embodiment 9

The method of any of embodiments 6-8, further comprising: in response to determining that the third PPDU was received correctly, commencing, by the first communication device, the second ranging measurement exchange a predetermined time period after an end of reception of the third PPDU without determining whether a channel medium is idle.

Embodiment 10

The method of any of embodiments 1-9, further comprising: calculating, by the first communication device, a distance between the first communication device and the second communication device, using measurements corresponding to the set of ranging measurement exchanges.

Embodiment 11

An apparatus, comprising: a network interface device associated with a first communication device, wherein the network interface device comprises one or more integrated circuit (IC) devices. The one or more IC devices are configured to: transmit a first physical layer protocol data units (PPDU) that includes a first null data packet announcement (NDPA) frame as part of a first ranging measurement exchange, wherein the first ranging measurement exchange is among a set of ranging measurement exchanges; transmit a first null data packet (NDP) as part of the first ranging measurement exchange; record a transmit time of the first NDP; determine whether a second NDP was received correctly from a second communication device as part of the first ranging measurement exchange; and in response to determining that the second NDP was not received correctly, commence a second ranging measurement exchange, including transmitting a second PPDU that includes a second NDPA frame as part of the second ranging measurement exchange, wherein the second ranging measurement exchange is among the set of ranging measurement exchanges.

Embodiment 12

The apparatus of embodiment 11, wherein the one or more IC devices are configured to: as part of determining whether the second NDP was received correctly, determine whether the first communication device began receiving the second NDP within an expected time period; in response to determining that the first communication device did not begin receiving the second NDP within the expected time period, perform a backoff operation; and commence the second ranging measurement exchange after the backoff operation.

Embodiment 13

The apparatus of embodiment 11, wherein the one or more IC devices are configured to: as part of determining whether the second NDP was received correctly, determine whether the first communication device began receiving the second NDP within an expected time period; in response to determining that the first communication device did not begin receiving the second NDP within the expected time period, determine whether a channel medium is idle for a predetermined time period; and commence the second ranging measurement exchange in response to determining that the channel medium is idle for the predetermined time period.

Embodiment 14

The apparatus of any of embodiments 11-13, wherein the one or more IC devices are configured to: as part of determining whether the second NDP was received correctly, determine whether the first communication device correctly decoded one or more signal fields in the second NDP; in response to determining that the first communication device did not correctly decode the one or more signal fields in the second NDP, perform backoff operation; and commence the second ranging measurement exchange after the backoff operation.

Embodiment 15

The apparatus of any of embodiments 11-13, wherein the one or more IC devices are configured to: as part of determining whether the second NDP was received correctly, determine whether the first communication device correctly decoded one or more signal fields in the second NDP; in response to determining that the first communication device did not correctly decode the one or more signal fields in the second NDP, determine whether a channel medium is idle for a predetermined time period; and commence the second ranging measurement exchange in response to determining that the channel medium is idle for the predetermined time period.

Embodiment 16

The apparatus of any of embodiments 11-15, wherein the one or more IC devices are configured to: record a receive time of the second NDP; determine a third PPDU was received correctly as part of the first ranging measurement exchange, wherein the third PPDU includes ranging measurement feedback from the second communication device; and in response to determining that the third PPDU was not received correctly, commence the second ranging measurement exchange, including transmitting the second PPDU that includes the second NDPA frame as part of the second ranging measurement exchange.

Embodiment 17

The apparatus of embodiment 16, wherein the one or more IC devices are configured to: in response to determining that the third PPDU was not received correctly, perform a backoff operation; and commence the second ranging measurement exchange after the backoff operation.

Embodiment 18

The apparatus of embodiment 16, wherein the one or more IC devices are configured to: in response to that the third PPDU was not received correctly, determine whether a channel medium is idle for a predetermined time period; and commence the second ranging measurement exchange in response to determining that the channel medium is idle for the predetermined time period.

Embodiment 19

The apparatus of any of embodiments 16-18, wherein the one or more IC devices are configured to: in response to determining that the third PPDU was received correctly, commence the second ranging measurement exchange a predetermined time period after an end of reception of the third PPDU without determining whether a channel medium is idle.

Embodiment 20

The apparatus of any of embodiments 11-19, wherein the one or more IC devices are configured to: calculate a distance between the first communication device and the second communication device, using measurements corresponding to the set of ranging measurement exchanges.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   transmitting, by a first communication device, a first physical layer protocol data units (PPDU) that includes a first null data packet announcement (NDPA) frame as part of a first ranging measurement exchange, wherein the first ranging measurement exchange is among a set of ranging measurement exchanges;
   transmitting, by the first communication device, a first null data packet (NDP) as part of the first ranging measurement exchange;
   recording, by the first communication device, a transmit time of the first NDP;
   determining, by the first communication device, whether a second NDP was received correctly from a second communication device as part of the first ranging measurement exchange; and
   determining whether a second NDP was received correctly includes determining, by the first communication device, whether the first communication device began receiving the second NDP within an expected time period.

2. The method of claim 1, wherein:
   determining whether the second NDP was received correctly includes determining, by the first communication device, whether the first communication device began receiving the second NDP within an expected time period;
   the method further comprises: in response to determining that the first communication device did not begin receiving the second NDP within the expected time period, performing, by the first communication device, a backoff operation; and
   the second ranging measurement exchange is commenced after the backoff operation.

3. The method of claim 1, wherein:
   determining whether the second NDP was received correctly includes determining, by the first communication device, whether the first communication device began receiving the second NDP within an expected time period;

the method further comprises: in response to determining that the first communication device did not begin receiving the second NDP within the expected time period, determining, by the first communication device, whether a channel medium is idle for a predetermined time period; and the second ranging measurement exchange is commenced in response to determining that the channel medium is idle for the predetermined time period.

4. The method of claim 1, wherein:

determining whether the second NDP was received correctly includes determining, by the first communication device, whether the first communication device correctly decoded one or more signal fields in the second NDP;

the method further comprises: in response to determining that the first communication device did not correctly decode the one or more signal fields in the second NDP, performing, by the first communication device, a backoff operation; and the second ranging measurement exchange is commenced after the backoff operation.

5. The method of claim 1, wherein:

determining whether the second NDP was received correctly includes determining, by the first communication device, whether the first communication device correctly decoded one or more signal fields in the second NDP;

the method further comprises: in response to determining that the first communication device did not correctly decode the one or more signal fields in the second NDP, determining, by the first communication device, whether a channel medium is idle for a predetermined time period; and the second ranging measurement exchange is commenced in response to determining that the channel medium is idle for the predetermined time period.

6. The method of claim 1, further comprising:

receiving, by the first communication device, the second NDP correctly;

recording, by the first communication device, a receive time of the second NDP;

determining, by the first communication device, whether a third PPDU was received correctly as part of the first ranging measurement exchange, wherein the third PPDU includes ranging measurement feedback from the second communication device; and in response to determining that the third PPDU was not received correctly, commencing, by the first communication device, the second ranging measurement exchange, including transmitting the second PPDU that includes the second NDPA frame as part of the second ranging measurement exchange.

7. The method of claim 6, further comprising:

in response to determining that the third PPDU was not received correctly, performing, by the first communication device, a backoff operation; and the second ranging measurement exchange is commenced after the backoff operation.

8. The method of claim 6, further comprising:

in response to that the third PPDU was not received correctly, determining, by the first communication device, whether a channel medium is idle for a predetermined time period; and the second ranging measurement exchange is commenced in response to determining that the channel medium is idle for the predetermined time period.

9. The method of claim 6, further comprising:

in response to determining that the third PPDU was received correctly, commencing, by the first communication device, the second ranging measurement exchange a predetermined time period after an end of reception of the third PPDU without determining whether a channel medium is idle.

10. The method of claim 1, further comprising:

calculating, by the first communication device, a distance between the first communication device and the second communication device, using measurements corresponding to the set of ranging measurement exchanges.

11. An apparatus, comprising:

a network interface device associated with a first communication device, wherein the network interface device comprises one or more integrated circuit (IC) devices configured to:

transmit a first physical layer protocol data units (PPDU) that includes a first null data packet announcement (NDPA) frame as part of a first ranging measurement exchange, wherein the first ranging measurement exchange is among a set of ranging measurement exchanges, transmit a first null data packet (NDP) as part of the first ranging measurement exchange, record a transmit time of the first NDP, determine whether a second NDP was received correctly from a second communication device by the first communication device as part of the first ranging measurement exchange including whether the first communication device began receiving the second NDP within an expected time period.

12. The apparatus of claim 11, wherein the one or more IC devices are configured to:

as part of determining whether the second NDP was received correctly, determine whether the first communication device began receiving the second NDP within an expected time period;

in response to determining that the first communication device did not begin receiving the second NDP within the expected time period, perform a backoff operation.

13. The apparatus of claim 11, wherein the one or more IC devices are configured to:

as part of determining whether the second NDP was received correctly, determine whether the first communication device began receiving the second NDP within an expected time period;

in response to determining that the first communication device did not begin receiving the second NDP within the expected time period, determine whether a channel medium is idle for a predetermined time period; and commence the second ranging measurement exchange in response to determining that the channel medium is idle for the predetermined time period.

14. The apparatus of claim 11, wherein the one or more IC devices are configured to:

as part of determining whether the second NDP was received correctly, determine whether the first communication device correctly decoded one or more signal fields in the second NDP;

in response to determining that the first communication device did not correctly decode the one or more signal fields in the second NDP, perform backoff operation; and commence the second ranging measurement exchange after the backoff operation.

15. The apparatus of claim 11, wherein the one or more IC devices are configured to:
as part of determining whether the second NDP was received correctly, determine whether the first communication device correctly decoded one or more signal fields in the second NDP;
in response to determining that the first communication device did not correctly decode the one or more signal fields in the second NDP, determine whether a channel medium is idle for a predetermined time period; and
commence the second ranging measurement exchange in response to determining that the channel medium is idle for the predetermined time period.

16. The apparatus of claim 11, wherein the one or more IC devices are configured to:
record a receive time of the second NDP;
determine a third PPDU was received correctly as part of the first ranging measurement exchange, wherein the third PPDU includes ranging measurement feedback from the second communication device; and
in response to determining that the third PPDU was not received correctly, commence the second ranging measurement exchange, including transmitting the second PPDU that includes the second NDPA frame as part of the second ranging measurement exchange.

17. The apparatus of claim 15, wherein the one or more IC devices are configured to:
in response to determining that the third PPDU was not received correctly, perform a backoff operation; and
commence the second ranging measurement exchange after the backoff operation.

18. The apparatus of claim 15, wherein the one or more IC devices are configured to:
in response to that the third PPDU was not received correctly, determine whether a channel medium is idle for a predetermined time period; and
commence the second ranging measurement exchange in response to determining that the channel medium is idle for the predetermined time period.

19. The apparatus of claim 15, wherein the one or more IC devices are configured to:
in response to determining that the third PPDU was received correctly, commence the second ranging measurement exchange a predetermined time period after an end of reception of the third PPDU without determining whether a channel medium is idle.

20. The apparatus of claim 11, wherein the one or more IC devices are configured to:
calculate a distance between the first communication device and the second communication device, using measurements corresponding to the set of ranging measurement exchanges.

* * * * *